(12) United States Patent
Hirayama

(10) Patent No.: US 6,911,628 B1
(45) Date of Patent: Jun. 28, 2005

(54) CONTROL SYSTEM AND CONTROL UNIT

(75) Inventor: Hirofumi Hirayama, Tokyo (JP)

(73) Assignee: Yamatake Corporation, Tokyo (JP)

( * ) Notice: Subject to any disclaimer, the term of this patent is extended or adjusted under 35 U.S.C. 154(b) by 40 days.

(21) Appl. No.: 10/626,543

(22) Filed: Jul. 25, 2003

Related U.S. Application Data

(63) Continuation of application No. PCT/JP01/08240, filed on Sep. 21, 2001.

(30) Foreign Application Priority Data

Jan. 25, 2001 (JP) .......................... 2001-17480

(51) Int. Cl.[7] .............................................. H05B 1/02
(52) U.S. Cl. ...................... 219/486; 219/483; 219/506; 219/497; 392/416
(58) Field of Search ............................... 219/483–486, 219/501, 506, 412–414, 497, 492; 392/416, 418; 438/799

(56) References Cited

U.S. PATENT DOCUMENTS 5,909,370 A * 6/1999 Lynch ......................... 700/50
6,114,216 A * 9/2000 Yieh et al. .................. 438/424
6,207,936 B1 * 3/2001 de Waard et al. ........... 219/497

FOREIGN PATENT DOCUMENTS

| JP | 48-53180 A | 7/1973 |
| JP | 62-015603 A | 1/1987 |
| JP | 2-253316 A | 10/1990 |
| JP | 5-25502 U | 4/1993 |
| JP | 6-65901 U | 9/1994 |
| JP | 7-96168 A | 4/1995 |
| JP | 7-200078 A | 8/1995 |
| JP | 9-311727 A | 12/1997 |
| JP | 11-345002 A | 12/1999 |

* cited by examiner

*Primary Examiner*—Mark Paschall
(74) *Attorney, Agent, or Firm*—Rothwell, Figg, Ernst & Manbeck, PC

(57) ABSTRACT

A control unit, which divides a controlled system into a plurality of zones and carries out control of the individual zones separately, can match the timings for the zones to reach a steady-state reference temperature by basic control. It can effectively reduce overshoot and undershoot after reaching the steady-state reference temperature, and suitably control the temperature of a wafer in the fabrication process of semiconductor devices.

11 Claims, 24 Drawing Sheets

FIG.5
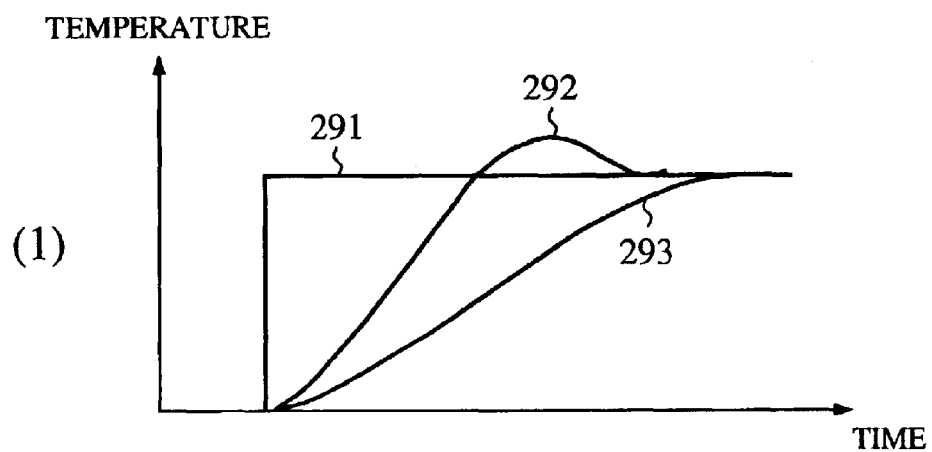
(1)
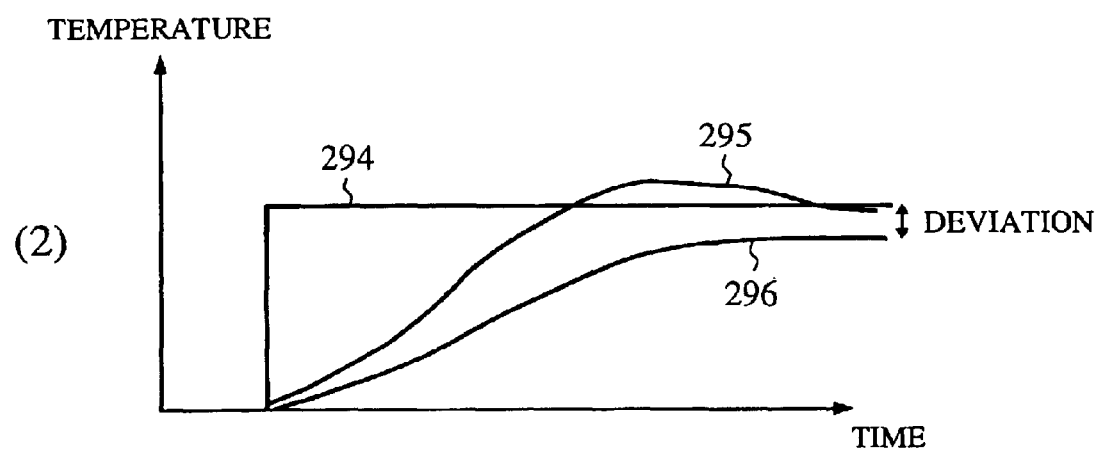
(2)

US 6,911,628 B1

CONTROL SYSTEM AND CONTROL UNIT

This application is a continuation of International Application No. PCT/JP01/08240, filed Sep. 21, 2001.

TECHNICAL FIELD

The present invention relates to a control system such as PID control (Proportional, Integral and Derivative control) and IMC (Internal Model Control) used for controlling wafer temperature in a semiconductor process, for example, and more particularly to a control system preferably applicable to control the temperature of a wafer uniformly in its entirety using a plurality of heaters.

BACKGROUND ART

FIG. 1 is a block diagram showing a configuration of a conventional basic PID control system. In FIG. 1, the reference numeral 224 designates a wafer placed in a constant temperature oven not shown; 225 designates a thermocouple for detecting the temperature near the wafer 224; 226 designates a PID computation section for receiving the temperature detected by the thermocouple 225 along with a steady-state reference temperature, and for outputting a manipulated variable that will converge the detected temperature to the steady-state reference temperature; 227 designates a control section for carrying out control in response to the manipulated variable; 228 designates a heater placed near the wafer 224; 229 designates a power supply; and 230 designates a control loop for connecting the heater 228 and power supply 229 to the control section 227.

Next, the operation will be described.

Once the steady-state reference temperature is set, the PID computation section 226 outputs a manipulated variable based on the PID control in response to the temperature difference of the temperature detected by the thermocouple 225 with respect to the steady-state reference temperature, and controls the energized duration of the heater 228 in response to the manipulated variable of the control section 227.

Accordingly, the conventional basic PID control system can control the temperature at and around the position of the thermocouple 225 such that it is stabilized at the steady-state reference temperature.

However, as the size of the wafer 224 to be controlled increases, there arises a problem of being unable to control the temperature of the entire wafer 224 uniformly.

In view of this, Japanese patent application laid-open No. 7-96168 discloses a technique that divides the space associated with the temperature control into zones, and carries out the PID control of the individual zones separately. The PID control, which is performed separately for the individual targets to be controlled, causes difference in timing for the individual zones to reach the steady-state reference temperature depending on their environment and positional relationships, even if the same steady-state reference temperature is used for the control. Thus, it also discloses the technique for controlling the start and end timing of the PID control of the individual zones.

FIG. 2 is a block diagram showing a configuration of a second conventional PID control system disclosed in the foregoing Japanese patent application laid-open No. 7-96168. In FIG. 2, the reference numeral 231 designates a process controller for outputting a preset temperature in accordance with a specified program; 232 designates a ramp signal generator for outputting a ramp waveform having the preset temperature as its final temperature; 233 designates a PID controller for receiving the ramp waveform as the steady-state reference temperature, and for calculating and outputting a manipulated variable; and 234 designates a furnace, the temperature of which is controlled by the PID controller 233. Reference numerals 235 designate a plurality of intra-furnace temperature sensors. The reference numeral 236 designates an initializing memory for presetting a comparison reference temperature; 237 designates a time difference measuring circuit for measuring timings at which the temperatures detected by the individual intra-furnace temperature sensors 235 agree with the comparison reference temperature, and for outputting the time differences; and 238 designates a time difference table memory for storing data for controlling the generating timing of the ramp signal of the ramp signal generator 232 in response to the time difference.

Next, the operation will be described.

The process controller 231 outputs the preset temperature in a state in which the comparison reference temperature is preset in the memory 236. In response to the output, the ramp signal generator 232 generates the ramp waveform having the preset temperature as the final temperature, and the PID controller 233, receiving the ramp waveform as the steady-state reference temperature, calculates and outputs the manipulated variable. As a result, the temperature of the furnace 234 varies toward the preset temperature. If the temperatures detected by the individual intra-furnace temperature sensors 235 agree with the comparison reference temperature in the course of the temperature variation, the time difference measuring circuit 237 measures the coincident timings, and supplies the time differences between them to the time difference table memory 238. The time difference table memory 238 selects the table data that will compensate for the time differences, and supplies them to the ramp signal generator 232.

Subsequently, in response to the preset temperature the process controller 231 outputs, the ramp signal generator 232 adjusts the output start timings of the time ramp waveforms using the time preset by the difference table memory 238. Thus, in response to the ramp waveforms, the temperature of the furnace 234 is controlled to the preset temperature. Consequently, it can control the temperature of the single furnace 234 by carrying out a plurality of PID controls, and match the timings theoretically at which the temperatures reach the steady-state reference temperature.

FIG. 3 is a block diagram showing a configuration of a control system using the conventional control unit. In FIG. 3, the reference numeral 261 designates a control unit having a PID control function; 262 designates a constant temperature oven; 263 designates a wafer placed in the constant temperature oven; 264 designates a heater for controlling the internal temperature of the constant temperature oven 262 in response to the manipulated variable fed from the control unit 261; and 265 designates a temperature sensor for detecting the temperature near the wafer 263.

Next, the operation will be described.

The control unit 261 having the PID control function receives the temperature measurement value the temperature sensor 265 detects, carries out the calculation based on the PID control function such that the measurement value matches the reference temperature preset value, and calculates the manipulated variable. The manipulated variable is supplied to the heater 264. The heater 264 controls the internal temperature of the constant temperature oven 262 by varying the energized duration in accordance with the manipulated variable. Thus, the control is carried out in such a manner that the temperature of the wafer 263 agrees with the preset reference temperature.

Incidentally, as the size of the wafer 263 to be controlled increases, it becomes more difficult to control the temperature of the entire wafer 263 uniformly. In this case, it will be possible to divide the wafer 263 to be controlled into a plurality of regions, and utilize the foregoing control unit 261 having the PID control function for each of these regions. Assigning the temperature sensor 265 and heater 264 to each of the regions to carry out the PID control individually enables the temperatures of the individual regions to match the preset reference temperature.

However, such a control method has a problem of being unable to carry out suitable control because of interference between temperatures of the individual regions. Specifically, although the temperature of a particular region is controlled by the PID control via the heater of that region, the heaters of other regions have influences on the temperature of that region, thereby deteriorating the appropriate control.

To solve the problem, the control system as shown in FIG. 4 is used, for example. In FIG. 4, the reference numeral 271 designates a control unit with the PID control function; 272 designates a constant temperature oven; 273 designates a wafer placed in the constant temperature oven 272; 274-1 designates a heater for controlling the temperature of a first region 273-1 in the constant temperature oven 272 in response to a ch1-manipulated variable; 274-2 designates a heater for controlling the temperature of a second region 273-2 in the constant temperature oven 272 in response to a ch2-manipulated variable; 275 designates a temperature sensor for detecting the temperature near the wafer 273; 281 designates a reference value preset section for presetting the reference temperature of the wafer 273; 282 designates an adder for calculating a deviation from the temperature measurement value the temperature sensor 275 detects and the preset value the reference value preset section 281 presets; 283 designates a PID computation section for performing the PID computation on the deviation the adder 282 calculates, and for outputting the manipulated variable; 284 designates a manipulated variable limiter for putting an upper and lower limits to the manipulated variable; reference numerals 285-1 and 285-2 designate a first ratio computation section and a second ratio computation section for performing a ratio computation on the manipulated variable; 286-1 and 286-2 designate a first offset computation section and a second offset computation section for performing an offset computation on the manipulated variable; the reference numeral 287 designates a branch point for branching the manipulated variable output from the manipulated variable limiter 284; and 288 designates a parameter preset section such as a keyboard for manually presetting parameters of the manipulated variable limiter 284 and the like.

Next, the operation will be described.

The control unit 271 receives the temperature measurement value the temperature sensor 275 detects, and carries out the following processing therein. First, the adder 282 calculates the deviation from the preset value of the reference temperature preset by the reference value preset section 281, and the PID computation section 283 determines the manipulated variable by the PID computation. Then, the manipulated variable limiter 284 puts the upper and lower limits on the manipulated variable, followed by branching it by the branch point 287.

A first branched manipulated variable becomes a ch1-manipulated variable through the first ratio computation section 285-1 and first offset computation section 286-1. Likewise, a second branched manipulated variable becomes a ch2-manipulated variable through the second ratio computation section 285-2 and second offset computation section 286-2.

The ch1-manipulated variable is supplied to the heater 274-1. The heater 274-1 controls the temperature of the first region 273-1 in the constant temperature oven 272 by varying energized duration in response to the ch1-manipulated variable, for example. Likewise, the ch2-manipulated variable is supplied to the heater 274-2, which controls the temperature of the second region 273-2 in the constant temperature oven 272 in response to the ch2-manipulated variable.

In this case, the parameters of the manipulated variable limiter 284, first ratio computation section 285-1, second ratio computation section 285-2, first offset computation section 286-1, and second offset computation section 286-2 have been set in the parameter preset section 288 in advance by a key operation at an adjustment such that the temperature of the wafer 273 is matched to the reference temperature.

In this way, by controlling the heater 274-1 placed in the first region 273-1 and the heater 274-2 placed in the second region 273-2, the temperatures of the individual regions are controlled such that they match to the reference temperature. Thus, the temperature of the entire wafer 273 is controlled such that it matches the preset reference temperature.

With the foregoing configuration, it is surely possible for the second conventional PID control system as shown in FIG. 2 to match the timings to reach the steady-state reference temperature, theoretically. However, since it varies only the start timings (end timings) of the individual PID controls, it has the following problems. First, it is difficult for it to match the timings without an additional ramp generator that continuously varies the steady-state reference temperature itself up to the final steady-state reference temperature in FIG. 2. In addition, it has a problem of introducing an overshoot or undershoot after reaching the steady-state reference temperature even if the coefficients in the individual PID controls are set to prevent the overshoot and undershoot. The overshoot or undershoot may hinder stabilizing the detected temperature at the steady-state temperature.

In other words, the second conventional PID control system holds as its data the time, differences in the timings to reach the given comparison reference temperatures in the temperature rise duration when the same steady-state reference temperature is preset for all the PID controls, and varies the timings to compensate for the time differences. It assumes in this case that the individual PID controls vary along the same curve of the temperature rise up to the steady-state reference temperature (thus, the ramp signal generator is used). However, because of the variations in the thermal conversion efficiency of the heaters in the individual PID controls and the variations in the heat dispersion characteristics of the individual regions depending on their environments, the curve of the temperature rise of the individual PID controls usually differ from one anther (that is, the time constants of the individual PID controls usually differ). Therefore if the final steady-state reference temperature is directly input to the individual PID controls, the manners of the temperature variations during the temperature rise will differ from region to region, even if the control is carried out such that the timings arriving at the comparison reference temperatures match. This will cause the temperature exchange between the regions because of the temperature gradient, which will differentiate the timings for the individual regions to reach the desired preset temperatures. As a result, the overshoot or undershoot will be introduced after reaching the preset temperature.

Although the foregoing description is made by way of example of the PID control system, other systems such as an IMC control system have similar problems.

Since the conventional control unit is configured as shown in FIGS. 3 and 4, it is likely to be able to control the temperature uniformly over the entire controlled system even if its size is large.

However, in the case where the controlled system is replaced to another controlled system, or the size of the controlled system varies, or the heaters have secular changes, or the temperature near the controlled system varies, it has a problem of being unable to control the temperature uniformly over the entire controlled system.

For example, assume in the control system of FIG. 4 that the controlled system, the wafer 273, is replaced by another type of wafer. In this case, the temperature of the first region 273-1 will be controlled appropriately because the temperature sensor 275 is placed at the first region 273-1. However, the temperature of second region 273-2 cannot be controlled suitably because of the difference in the thermal conductivity of the wafer 273 and the like. In addition, even if the temperature sensor 275 is placed at the center of the constant temperature oven 272, this will bring about inappropriate control of the temperature not only of the second region 273-2, but also of the first region 273-1.

FIG. 5 is a characteristic diagram of an internal temperature of the constant temperature oven 272 in the conventional control system as shown in FIG. 4. FIG. 5(1) is a characteristic diagram of the temperature of a first wafer, and FIG. 5(2) is a characteristic diagram of the temperature of a second wafer. Reference numerals 291 and 294 designate a reference temperature preset value that is preset by the reference value preset section 281; 292 and 295 each designate a temperature measurement value of the first region 273-1 the temperature sensor 275 detects; and 293 and 296 each designate a temperature measurement value of the second region 273-2 the temperature sensor detects.

According to the temperature characteristic of FIG. 5(1), the parameters of the manipulated variable limiter 284, first ratio computation section 285-1, second ratio computation section 285-2, first offset computation section 286-1 and second offset computation section 286-2 are set such that the temperature measurement values 292 and 293 match the reference preset temperature at the adjustment in advance. Accordingly, the temperature measurement values 292 and 293 match the reference preset temperature, resulting in appropriate control.

According to the temperature characteristic of FIG. 5(2), the control is performed on the second wafer in accordance with the parameters adjusted for the first wafer in advance. Consequently, the temperature measurement value 296 of the second region 273-2 has a certain deviation, preventing a uniform temperature over the entire wafer.

In this case, it is necessary to revise the parameters of the second ratio computation section 285-2 and second offset computation section 286-2 such that the uniform temperature control is carried out all over the second wafer. This means that the revision of the parameters must be done every time the controlled system is changed, which is very tedious. Likewise, it presents a problem of resetting the parameters to appropriate values when the environment conditions of the controlled system vary.

The present invention is implemented to solve the foregoing problems. Therefore it is an object of the present invention to provide a control system capable of controlling the temperature of a wafer in the process of fabricating semiconductor devices such as CCD sensors by matching the arriving timings at the steady-state reference temperature by the basic control without relying on a ramp signal generator or the like in spite of employing the method of dividing the controlled system into a plurality of regions and of carrying out control of the individual regions, and by effectively preventing the overshoot and undershoot after reaching the steady-state reference temperature.

Another object of the present invention is to provide a control unit capable of carrying out the control that will match the measurement values to the preset reference value all over the controlled system without revising the parameters even if the controlled system or environmental conditions are changed.

DISCLOSURE OF THE INVENTION

According to an aspect of the present invention, there is provided a control system for carrying out control such that a detection value as to a condition of a controlled system converges to a steady-state reference value, the control system comprising: a main computation section for carrying out control of the controlled system by receiving the steady-state reference value and the detection value, and by generating a manipulated variable that-varies such that the detection value converges to the steady-state reference value; a main detecting section for supplying the main computation section with the detection value; a sub-computation section for carrying out control of the controlled system by receiving the detection value of the main detecting section and another detection value, and by generating a manipulated variable that varies such that the another detection value converges to the detection value; and a sub-detecting section for supplying the sub-computation section with the another detection value.

Thus, the main computation section and each sub-computation section can control the temperature within a very small temperature difference between the zones, even if the heat dispersion characteristics have variations in the zones. Accordingly, only setting the steady-state reference temperature into the main computation section enables the temperatures of the individual zones to rise up to the steady-state reference temperature along the same curve of the temperature rise. In addition, since the temperatures can be stabilized at the steady-state reference temperature without any temperature difference between the zones without any setting processing, the occurrence of the overshoot and undershoot after reaching the steady-state reference temperature can be effectively suppressed. As a result, an advantage is obtained of being able to control the temperature of the wafer appropriately in the process of fabricating the wafer of semiconductor devices such as the CCD sensors.

The control system according to the present invention may further comprise a first selector for receiving the steady-state reference value and the detection value of the main detecting section, and for selecting and supplying one of them to the sub-computation section.

Thus, the control system offers an advantage of being able to control the individual zones in the same manner or separately. Utilizing the combination of these control schemes makes it possible to control the entire system to have a uniform temperature, or to control part of the system to have an independent temperature without adding any new control circuit.

In the control system according to the present invention, the sub-computation section may add a specified offset value to the input steady-state reference value or to the input detection value fed from the main detecting section, and control the controlled system in response to the resultant sum.

Thus, the control system can control all the zones such that they maintain fixed temperature differences by presetting the temperature differences of the individual zones as the offset values, and furthermore it can effectively suppress the oscillation of the sub-control systems by compensating for the delays produced in practice, by setting the response delays and the like of the sub-control systems as the offset values.

The control system according to the present invention may further comprise a steady-state reference value memory for storing the steady-state reference value and for supplying it to the main computation section and sub-computation section.

Thus, the control system offers an advantage of being able to control the individual zones with the single steady-state reference value memory.

The control system according to the present invention may further comprise: steady-state reference value memories for outputting steady-state reference values, a number of the steady-state reference value memories being equal to a total number of the main computation section and the sub-computation section; and a second selector for switching input sources to the main computation section or to the sub-computation sections among the steady-state reference value memories.

Thus, the control system offers an advantage of being able to control the individual zones with the single steady-state reference value memory. In addition, it can control the individual sub-computation section independently of the main computation section, thereby offering an advantage of being able to sharply increase the convenience of the system.

According to an aspect of the present invention, there is provided a control system for carrying out control such that a detection value as to a condition of a controlled system converges to a steady-state reference value, the control system comprising: a computation section for receiving the steady-state reference value and the detection value, and for outputting a first manipulated variable that varies such that the detection value converges to the steady-state reference value; a plurality of multiplication sections for receiving the first manipulated variable, and for outputting second manipulated variables by multiplying the first manipulated variable by preset ratio coefficients; and a ratio coefficient preset section for calculating ratio coefficients for the multiplication sections individually, and for setting the ratio coefficients to the multiplication sections, the ratio coefficients being calculated from the detection values of regions of the controlled system installed in correspondence to the plurality of multiplication sections, to reduce errors of the detection values of the regions of the controlled system with respect to the steady-state reference value, wherein the control system carries out control of the controlled system in response to the second manipulated variables.

Thus, in spite of the heat dispersion characteristic variations in the respective zones controlled in accordance with the second manipulated variable, the control system can control the temperatures with reducing the variations using the ratio coefficients.

Accordingly, only setting the steady-state reference temperature into the computation section enables the temperatures of the individual zones to rise up to the steady-state reference temperature along the same curve of the temperature rise. In addition, since the temperatures can be stabilized at the steady-state reference temperature without any temperature difference between the zones, the occurrence of the overshoot and undershoot after reaching the steady-state reference temperature can be effectively suppressed. As a result, an advantage is obtained of being able to control the temperature of the wafer appropriately in the process of fabricating a wafer of semiconductor devices such as the CCD sensors.

The control system according to the present invention may further comprise a ratio coefficient input section for presetting ratio coefficients to the multiplication sections.

Thus, the control system can preset the ratio coefficients.

Besides, the control system according to the present invention, offers an advantage of enabling a setting operator to carry out the optimum setting under a use environment by only conducting the measurement under the use environment.

In the control system according to the present invention, the number of the computation sections and the number of the multiplication sections may be N, and the control system may further comprise a first selector for switching input sources to the multiplication sections among the N computation sections.

Thus, the control system offers an advantage of being able to operate the individual zones in response to the first manipulated variable of the single computation section or to the first manipulated variables of the N computation sections. Utilizing the combination of these control schemes makes it possible to control the entire system to have a uniform temperature, or to control part of the system to have an independent temperature without adding any new control circuit.

The control system according to the present invention may further comprise: a second selector for receiving a first manipulated variable and a second manipulated variable, and for selecting and outputting one of them, wherein the control system controls the controlled system in response to the output of the second selector.

Thus, the control system can carry out the measurement for revising the ratio coefficients without correcting the values, which are preset in the multiplication sections, to unity each time. As a result, the measurement of the new ratio coefficients is possible without considering the multiplication sections on all such occasions. Besides, the previous values of the ratio coefficients can be left so that it offers an advantage of being able to provide a system capable of greatly increasing the convenience.

According to an aspect of the present invention, there is provided a control system comprising: a plurality of manipulating sections for varying a state of a controlled system independently of each other; a detecting section for detecting states of the controlled system; and a control section for supplying the plurality of manipulating sections with manipulated variables such that detection values as to the states of the controlled system by the detecting section converge to a steady-state reference value, wherein the detecting section detects the states in neighborhoods of all of the manipulating sections; and the manipulated variables the control section supplies to the manipulating sections are corrected using detection value deviations of the detection values near the manipulating sections with reference to a particular one of the detection values.

Thus, the control system can eliminate the detection value deviation between the detection values. Accordingly, the plurality of detection values can vary to the steady-state reference value along nearly the same temperature curves. As a result, in spite of the variations in the changing characteristics inherent in the differences in the manipulating sections and the zones they operate, all the regions can reach the final steady-state reference value almost simultaneously. In addition, it can suppress the overshoot and undershoot after reaching the preset temperature.

Thus, although the control system divides the controlled system into a plurality of zones to be controlled individually, it can match the timings for the zone temperatures to reach the steady-state reference temperature by the basic control without depending on any auxiliary circuit such as a ramp signal generator. In addition, since it can suppress the overshoot and undershoot effectively after reaching the steady-state reference temperature, it offers an advantage of being able to control the wafer temperature appropriately in the fabrication process of the semiconductor devices such as CCD sensors.

In the control system according to the present invention, the control section may comprise: a steady-state reference value memory circuit for storing a steady-state reference value; and computation circuits installed in a one-to-one correspondence to the manipulating sections, for calculating and outputting the manipulated variables for the manipulating sections by using control deviations of the detection values with respect to separate reference values, wherein one of the computation circuits, which corresponds to the manipulating section associated with the reference detection value, is supplied with the steady-state reference value as a separate reference value, and a remaining computation circuit is supplied with the reference detection value as the separate reference value.

Thus, the control system can further suppress the detection value error than when the steady-state reference values are separately set to all the control circuits, and hence reduce the absolute value of the detection value deviation by that amount, thereby being able to uniform the detection values.

According to an aspect of the present invention, there is provided a control unit that calculates manipulated variables such that measurement values, which represent states of a controlled system consisting of a plurality of regions, agree with a preset value, and that carries out control by supplying the regions with the manipulated variables, respectively, the control unit comprising: a manipulated variable computation section for calculating a first manipulated variable and a second manipulated variable in accordance with the measurement value of a first region of the controlled system and the preset value, and for supplying the first manipulated variable to the first region as a first region manipulated variable; a deviation control section for calculating a third manipulated variable from the measurement value of a remaining region of the controlled system and one of the preset value and the measurement value of the first region; and an adder for computing a manipulated variable from the second manipulated variable calculated by the manipulated variable computation section and the third manipulated variable calculated by the deviation control section, and for supplying the computed manipulated variable to the remaining region as a remaining region manipulated variable.

Thus, the control unit can eliminate, by means of the deviation control section and the adder, the deviation of the temperature measurement value in the remaining regions, which occurs when the controlled system is replace with another controlled system with a different type, or when the heaters have a secular change, or when the variation in the ambient temperature of the controlled system brings about changes of the environment.

Accordingly, it offers an advantage of being able to continue the control such that the measurement values of the entire controlled system converge to the reference preset value without changing any parameters, even if the above-mentioned changes occur.

BRIEF DESCRIPTION OF THE DRAWINGS

FIG. 5 is a diagram illustrating temperature characteristics of the control system using the conventional control unit;

BEST MODE FOR CARRYING OUT THE INVENTION

The best mode for carrying out the invention will now be described with reference to the accompanying drawings to explain the present invention in more detail.

Embodiment 1

Figure 1:
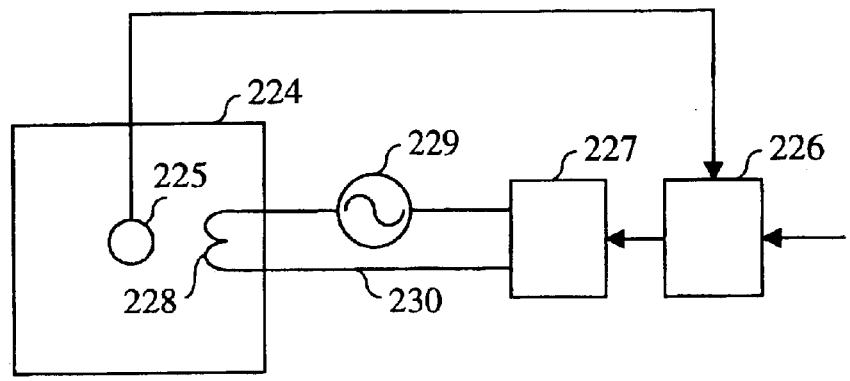
FIG. 1 is a block diagram showing a configuration of a conventional basic PID control system.
Figure 2:
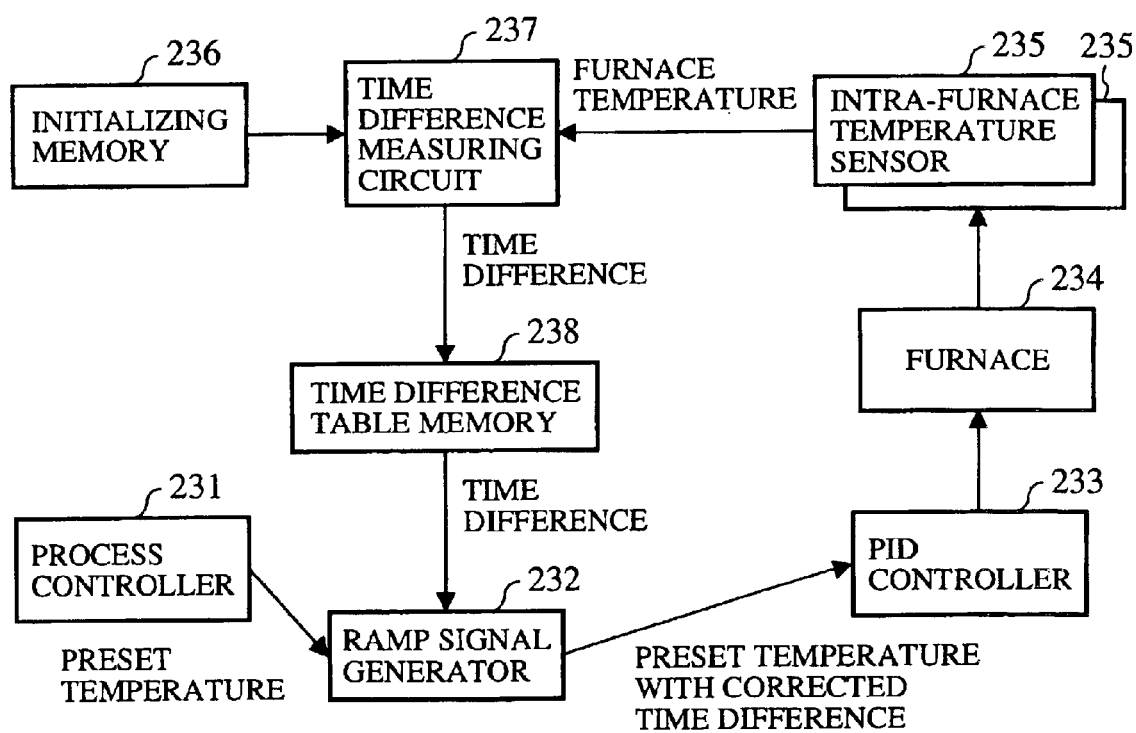
FIG. 2 is a block diagram showing a configuration of another conventional PID control system.
Figure 3:
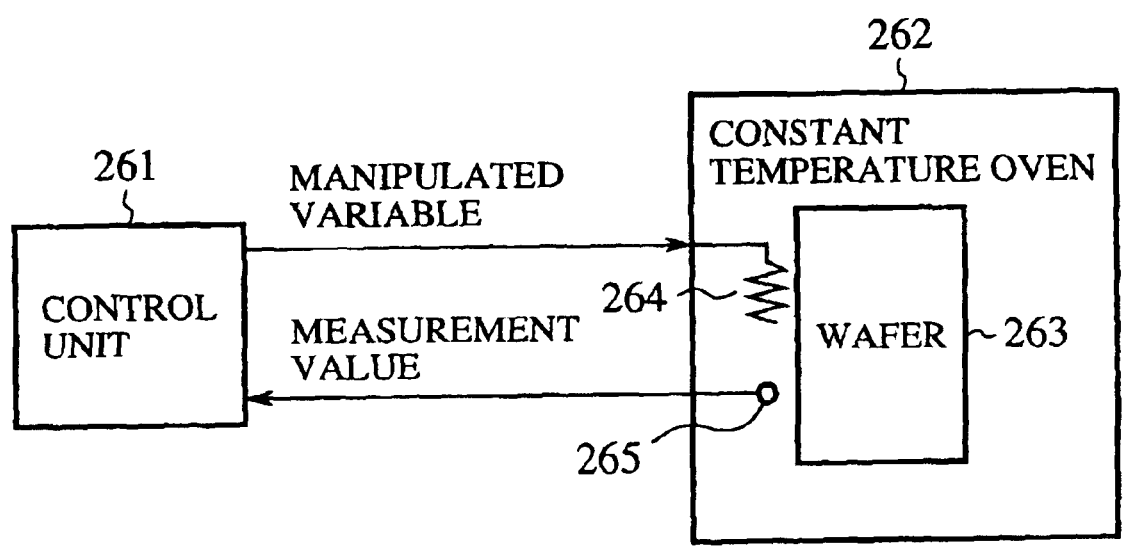
FIG. 3 is a block diagram showing a configuration of a control system using a conventional control unit.
Figure 4:
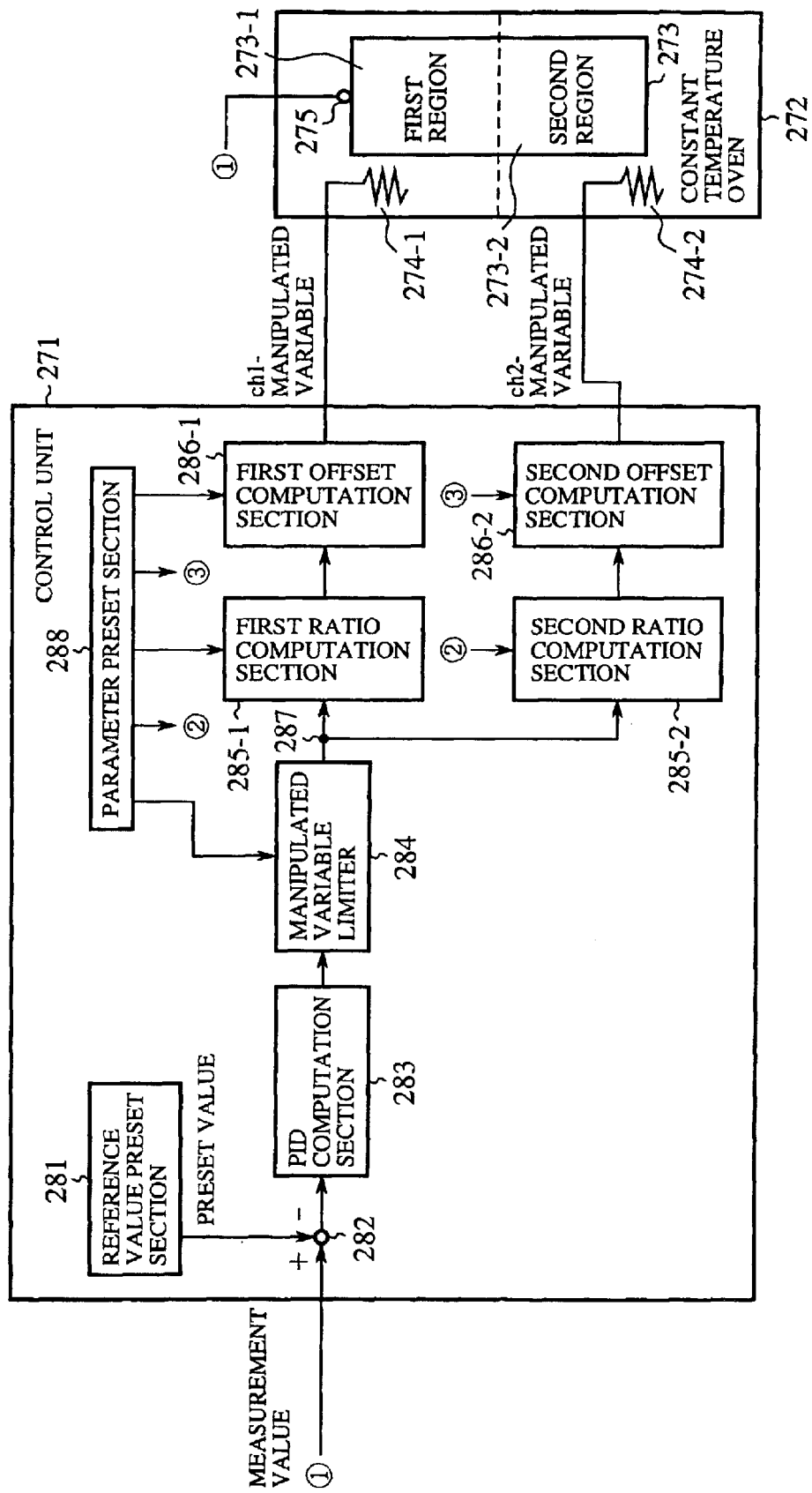
FIG. 4 is a block diagram showing a configuration of another control system using a conventional control unit.
Figure 6:
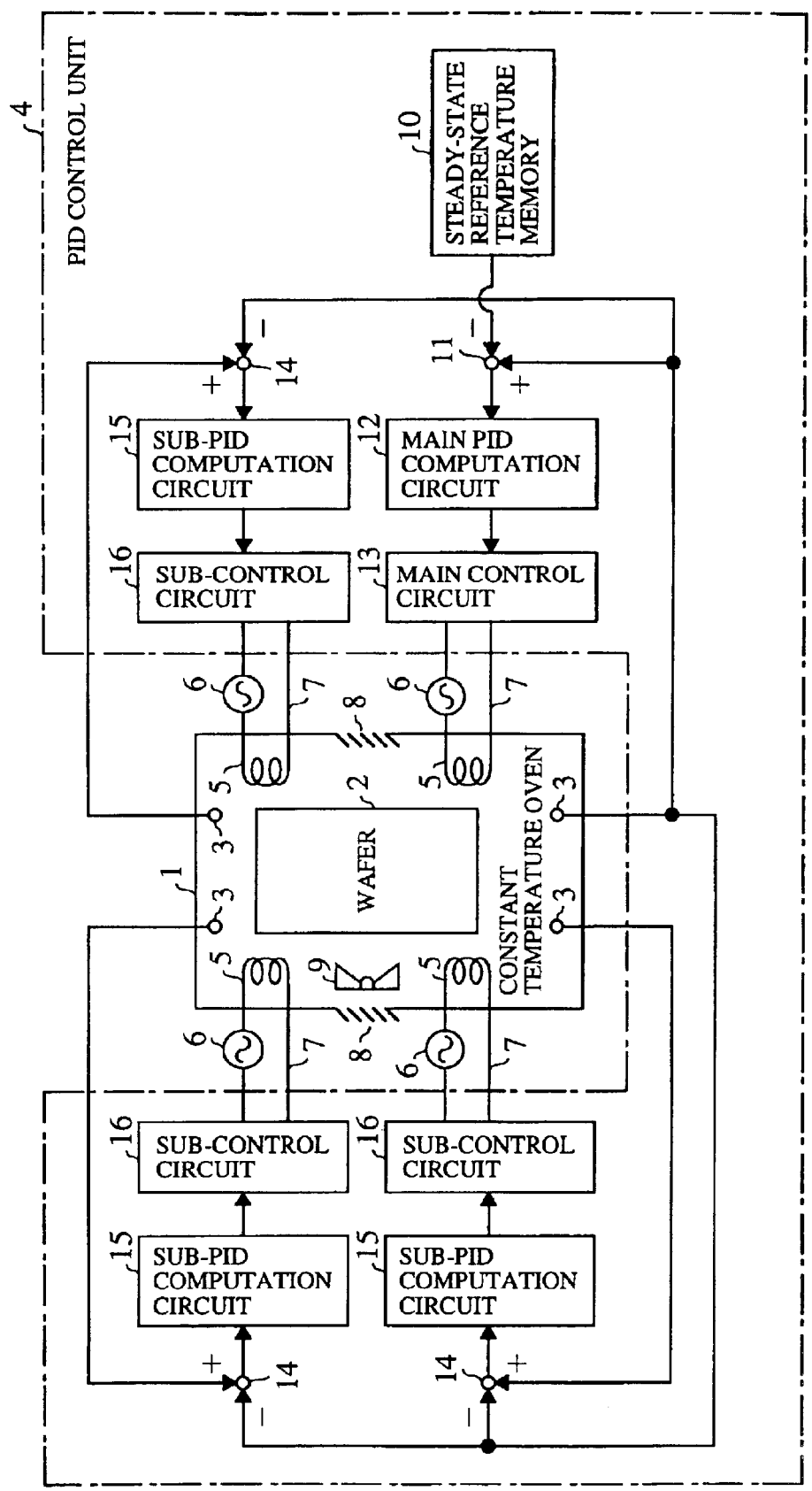
FIG. 6 is a block diagram showing a configuration of a PID control system of an embodiment 1 in accordance with the present invention.

FIG. 6 is a block diagram showing a configuration of a PID control system of an embodiment 1 in accordance with the present invention. In FIG. 6, the reference numeral 1 designates a constant temperature oven; and 2 designates a wafer for fabricating CCD sensors, which is placed in the constant temperature oven 1. Reference numerals 3 each designate a thermocouple that is placed near the wafer 2 for detecting the temperature. The reference numeral 4 designates a PID control unit for carrying out specified control using the temperatures detected by the plurality of thermocouples 3, . . . , and 3. Reference numerals 5 designate heaters provided near the wafer 2 in a one-to-on correspondence with the thermocouples 3; 6 designate power supplies provided in a one-to-one correspondence with the individual heaters 5; 7 designate control loops each for connecting one of the heaters 5 and one of the power supplies 6 to the PID control unit 4 in series; and 8 designate vents opened in a wall of the constant temperature oven 1. The reference numeral 9 designates a fan provided inside the vent 8.

In the PID control unit 4, the reference numeral 10 designates a steady-state reference temperature memory (steady-state reference temperature memory) for storing a steady-state reference temperature; 11 designates a main subtracter (main PID computation section) for subtracting the steady-state reference temperature from the temperature detected by one of the thermocouples 3 (which is called "main thermocouple 3" (main detecting section) from now on), and for outputting a main deviation temperature; 12 designates a main PID computation circuit (main PID computation section) for outputting a main manipulated variable based on the PID control computation, which will converge the main deviation temperature to zero; and 13 designates a main control circuit (main computation section) for receiving the main manipulated variable, and for carrying out the energizing control of the control loop 7 (called "main control loop 7" from now on) corresponding to the main thermocouple 3 in response-to the main manipulated variable.

Reference numerals 14 each designate a sub-subtracter (sub-PID computation section) for subtracting the temperature detected by the main thermocouple 3 from the temperature detected by one of the remaining thermocouples 3 (called "sub-thermocouples 3" (sub-detecting section) from now on), and for outputting a sub-deviation temperature; 15 each designate a sub-PID computation circuit (sub-PID computation section) for outputting a sub-manipulated variable based on the PID control computation, which will converge the sub-deviation temperature to zero; and 16 each designate a sub-control circuit (sub-computation section) for receiving one of the sub-manipulated variables, and for carrying out the energizing control of the control loop 7 (called "sub-control loop 7" from now on) corresponding to one of the sub-thermocouples 3 in response to the sub-manipulated variable.

Next, the operation will be described.

When a desired steady-state reference temperature is set in the steady-state reference temperature memory 10 in the state in which the detected temperature of all the thermocouples 3, . . . , and 3 are in a stable state in the room temperature, for example, the main subtracter 11 subtracts the steady-state reference temperature from the temperature detected by the main thermocouple 3, and outputs the main deviation temperature. The main PID computation circuit 12 outputs the main manipulated variable based on the PID control computation such that the main deviation temperature will converge to zero, and the main control circuit 13 carries out the energizing control of the main control loop 7 in response to the main manipulated variable. The main control circuit 13 carries out the energizing control as follows, for example. To raise the temperature (when the main deviation temperature is negative), it controls such that it lengthens the energized duration with an increase of the value of the main manipulated variable. In contrast, to reduce the temperature (when the main deviation temperature is positive), it controls such that it shortens the energized duration with an increase with the value of the main manipulated variable.

If the temperature of the main thermocouple 3 is increased by the control of the main control-loop 7, the sub-deviation temperature values output from the individual sub-subtracters 14 are increased in the negative direction. On the contrary, if the temperature of the main thermocouple 3 decrease, the sub-deviation temperature values output from the individual sub-subtracters 14 are increased in the positive direction. The individual sub-PID computation circuits 15 output the sub-manipulated variables based on the PID control computation, which will converge sub-deviation temperatures to zero, and the individual sub-control circuits 16 carry out the energizing control of the sub-control loops 7. In this case also, the sub-control circuits 16 carry out the energizing control as follows. When the sub-deviation temperatures are negative, they carry out the energizing control such that they lengthen the energized duration with an increase of the sub-manipulated variables. In contrast, when the sub-deviation temperatures are positive, they carry out the energizing control such that they shorten the energized duration with an increase of the sub-manipulated variables.

Accordingly, if the temperature of the main control loop 7 detected by the main thermocouple 3 increases, the detected temperatures of all the sub-thermocouples 3, . . . , and 3 increase in accordance with the increase of the temperature of the main control loop 7. In contrast, if the temperature of the main control loop 7 detected by the main thermocouple 3 decreases, the detected temperatures of all the sub-thermocouples 3, . . . , and 3 decrease in accordance with the decrease of the temperature of the main control loop 7. Thus, the temperatures in the constant temperature oven 1 are controlled up to the steady-state reference temperature with maintaining the temperature differences within a certain level, thereby converging all the temperatures to the steady-state reference temperature.

As a result, only setting the steady-state reference temperature in the steady-state reference temperature memory 10 corresponding to the main PID computation circuit 12 enables the constant temperature oven 1 to raise its temperatures up to the steady-state reference temperature along the same curve of the temperature rise, for example. In addition, since it can stabilize its temperatures to the steady-state reference temperature without causing temperature differences without carrying out any preset processing, it can effectively prevent the overshoot-and undershoot after achieving the steady-state reference temperature. Thus, it can control the temperature of the wafer 2 appropriately in the process of fabricating semiconductor devices such as CCD sensors.

Figure 7:
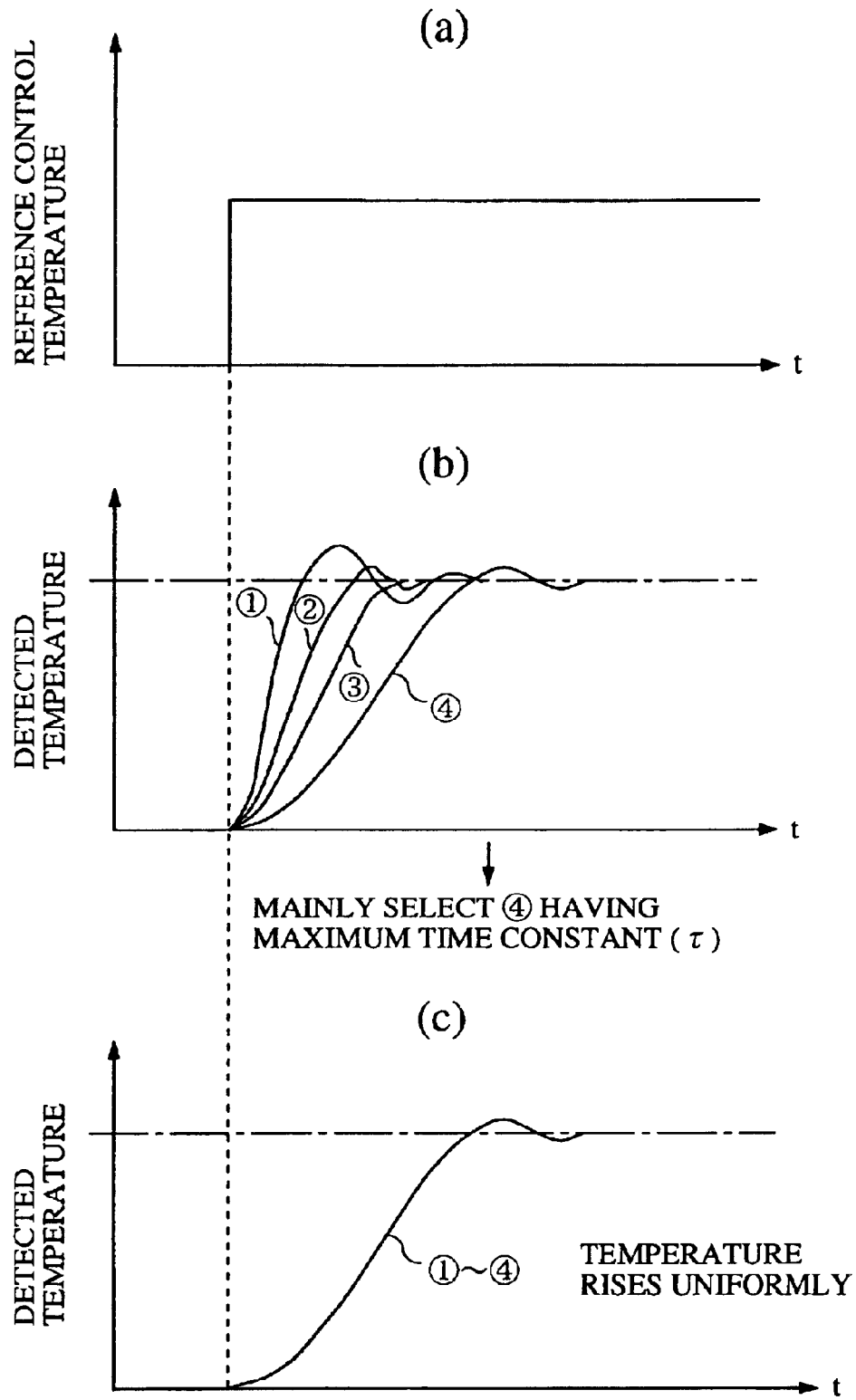
FIG. 7 is a diagram illustrating a selecting method of the main control loop of the embodiment 1 in accordance with the present invention.

Next, a selecting method of the main control loop will be described which is selected from the control loops 7, . . . , and 7 corresponding to one of the heaters 5. FIG. 7 is a diagram illustrating the selecting method of the main control loop in the embodiment 1 in accordance with the present invention. In FIG. 7, (a) illustrates a waveform of the reference control temperature, and (b) illustrates the temperature waveforms detected by the individual thermocouples 3, . . . , and 3 when the reference control temperature is supplied to all the control loops 7, . . . , and 7. Reference symbols ①–④ designates the detected temperature waveforms of the individual thermocouples 3. In this case, in which the detected temperature variations of the individual control loops 7 are as shown in FIG. 7(b), the one corresponding to the temperature variation with the greatest delay, that is, the control loop 7 corresponding to the thermocouple 3 with the greatest time constant ④ is selected as the main control loop. FIG. 7(c) illustrates the detected temperature waveforms of all the thermocouples 3, . . . , and 3 when the temperature control is carried out on the basis of the selected main control loop. The control can stabilize the temperatures at the steady-state reference temperature with limiting the detected temperatures of all the thermocouples 3, . . . , and 3 within a certain temperature difference. Incidentally, in the individual waveform diagrams, the horizontal axis designates an elapsed time, vertical axis of FIG. 7(a) represents the value of the reference control temperature, and the vertical axes of FIGS. 7(b) and 7(c) represent the detected temperatures.

Embodiment 2

Figure 8:
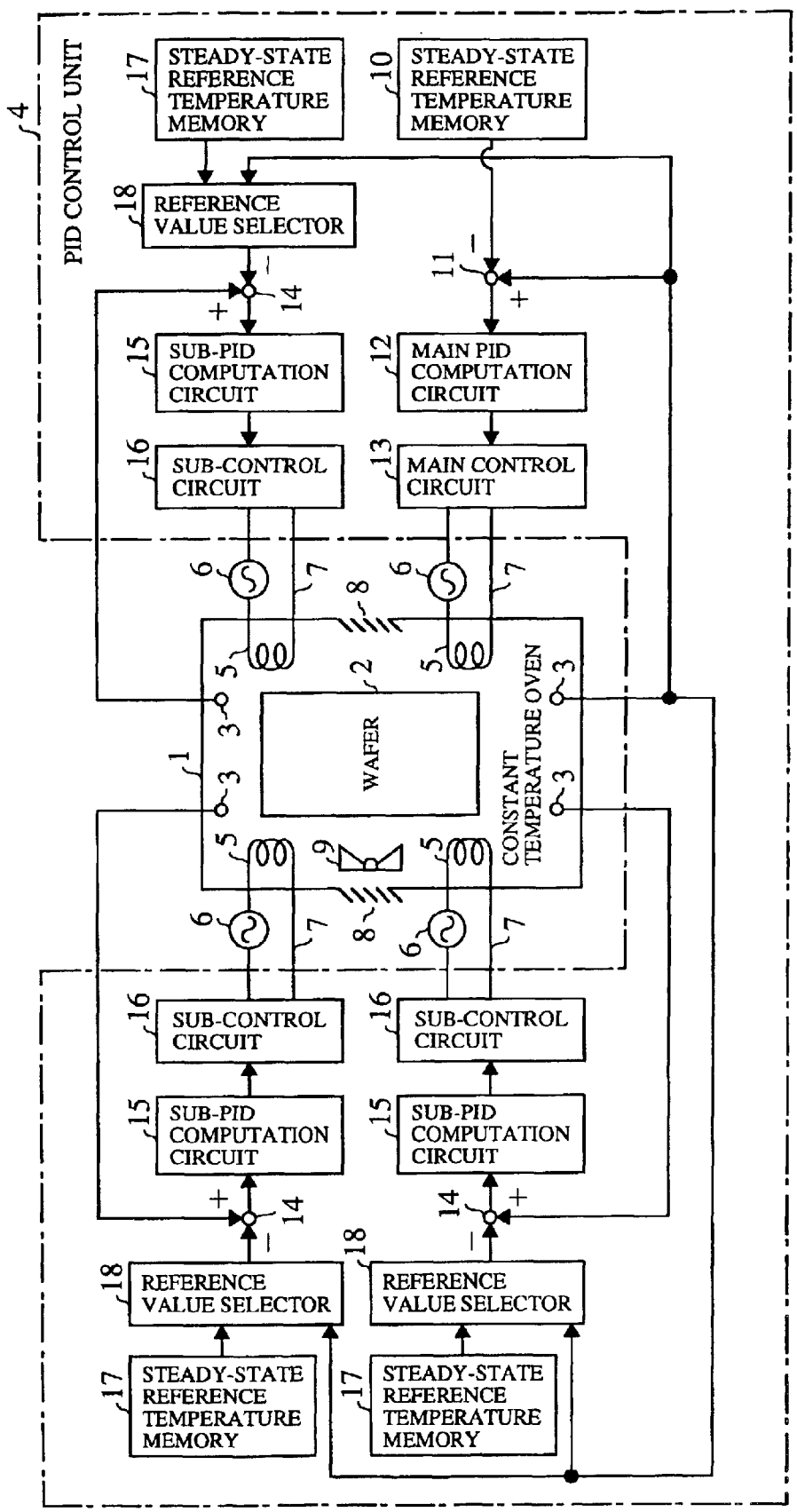
FIG. 8 is a block diagram showing a configuration of a PID control system of an embodiment 2 in accordance with the present invention.

FIG. 8 is a block diagram showing a configuration of a PID control system of an embodiment 2 in accordance with the present invention. In FIG. 8, reference numerals 17 each designate a steady-state reference temperature memory (steady-state reference temperature memory) for storing a steady-state reference temperature corresponding to one of the individual sub-subtracters 14; and 18 each designate a reference value selector (first selector) for selecting either the temperature detected by the main thermocouple 3 or the steady-state reference temperature stored in the steady-state reference temperature memory 17, and for supplying the selected one to the subtrahend input of the sub-subtracter 14. Since the remaining configuration is the same as that of the foregoing embodiment 1, the description thereof is omitted here.

Next, the operation will be described.

When the individual reference value selectors 18 select the temperature detected by the main thermocouple 3, the individual sub-subtracters 14 subtract the detected temperature from the temperatures detected by the sub-thermocouples 3, and output the resultant values as the sub-deviation temperatures. On the other hand, when the individual reference value selectors 18 select the steady-state reference temperatures stored in the individual steady-state reference temperature memory 17, the individual sub-subtracters 14 subtract the steady-state reference temperatures from the temperatures detected by the sub-thermocouples 3, and output the resultant values as the sub-deviation temperatures. Since the remaining configuration is the same as that of the foregoing embodiment 1, the description thereof is omitted here.

Thus, the present embodiment 2 enables the individual sub-control loops 7 to operate in accordance with the independent steady-state reference temperatures. Therefore it can control the individual sub-control loops 7 in the same manner in accordance with the temperature detected by the main thermocouple 3, or independently in accordance with the steady-state reference temperatures stored in the steady-state reference temperature memories 17. Consequently, it offers an advantage of being able to control the overall temperature uniformly without providing any new control circuit, or to control part of the temperatures independently.

As a result, it can achieve the following advantages, for example.

Figure 9:
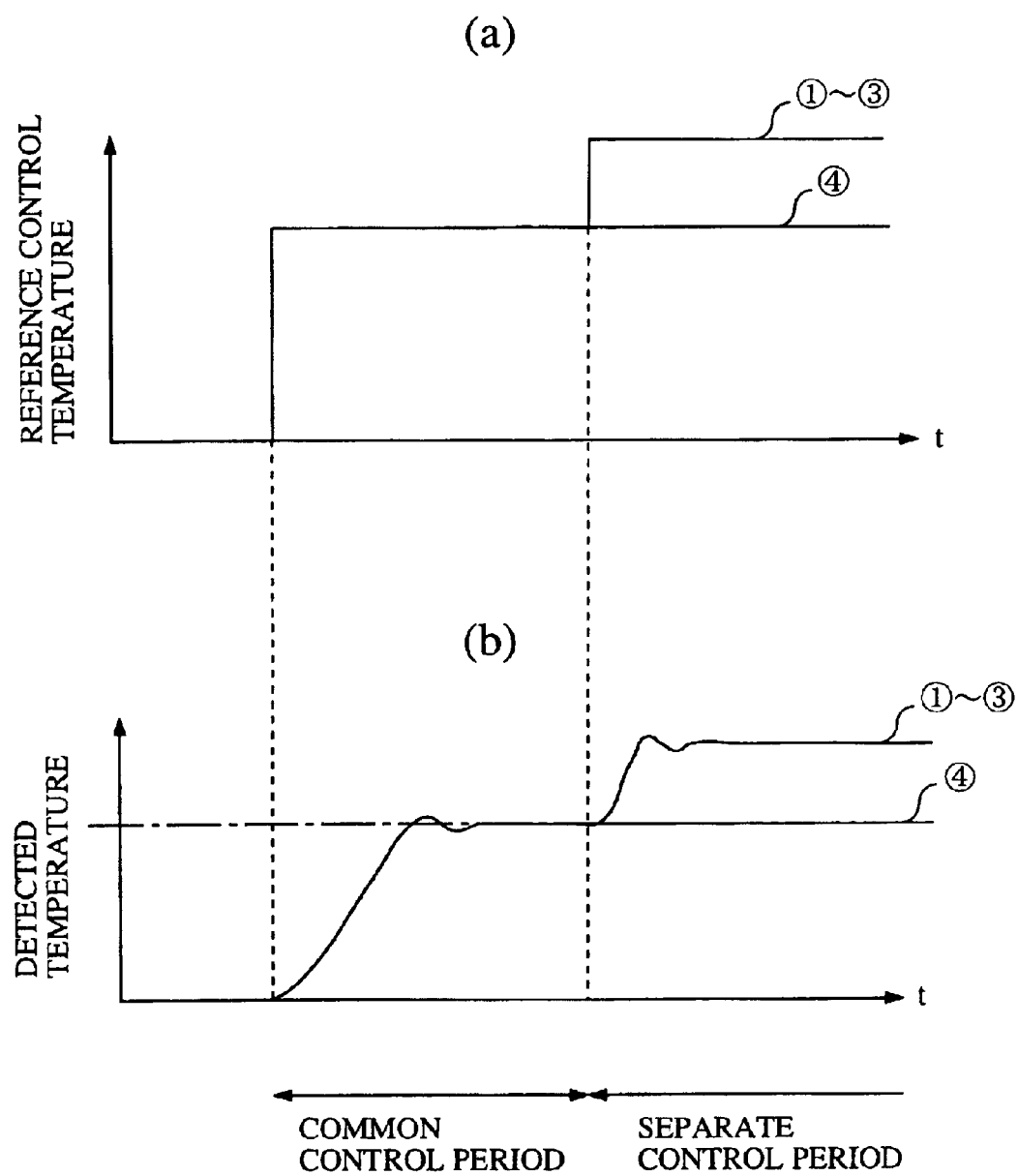
FIG. 9 is a diagram illustrating an example of the temperature control by the embodiment 2 in accordance with the present invention.

FIG. 9 is a diagram illustrating an example of the temperature control in the embodiment 2 in accordance with the present invention. In FIG. 9, (a) represents the waveforms of the reference control temperatures, and (b) represents the waveforms of the temperatures detected by all the thermocouples 3, . . . , and 3. The reference numerals ①–④ designate the waveforms of the temperatures detected by the individual thermocouples 3. Switching the selection of the individual reference value selectors 18 from the temperature detected by the main thermocouple 3 to the steady-state reference temperatures stored in the steady-state reference temperature memories 17 in the course of the temperature control cycle makes it possible to vary the temperatures freely in the regions in which the individual sub-thermocouples 3 are placed.

Figure 10:
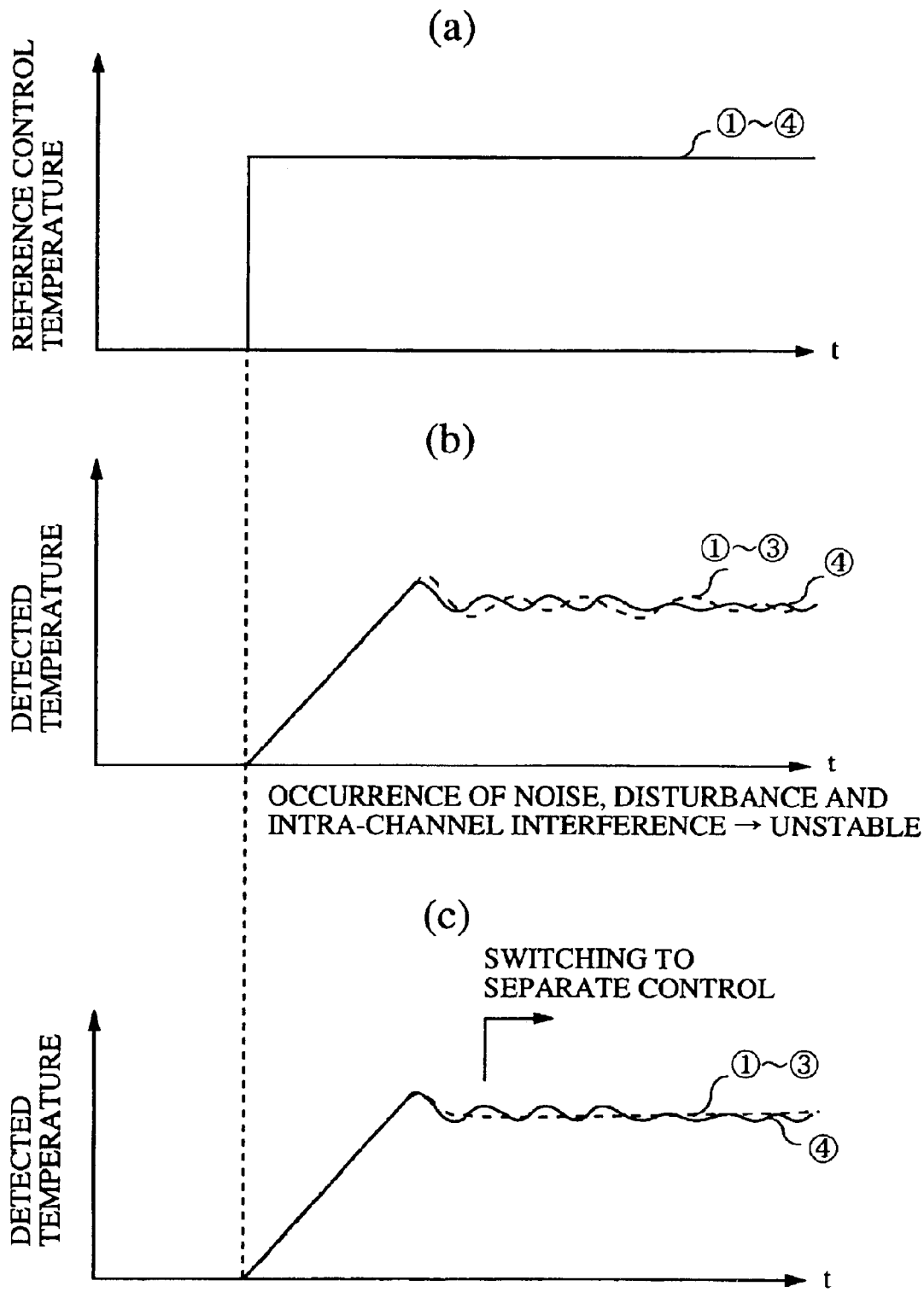
FIG. 10 is a diagram illustrating another example of the temperature control by the embodiment 2 in accordance with the present invention.

FIG. 10 is a diagram illustrating another example of the temperature control in the embodiment 2 in accordance with the present invention. In FIG. 10, (a) represents a waveform of the reference control temperature, and (b) and (c) each represent waveforms of the temperatures detected by all the thermocouples 3, . . . , and 3. Reference numerals ①–④ denote the waveforms of the temperatures detected by the individual thermocouples 3. FIG. 10(b) illustrates the case where the individual sub-control loops 7 operate continually using the temperature detected by the main thermocouples 3 as the reference, and the temperature detected by the main thermocouple 3 continues to fluctuate after reaching the steady-state reference temperature. In such a case, the individual temperatures detected by the sub-thermocouples 3 also fluctuate with certain delays, and can oscillate in some cases. As illustrated in FIG. 10(c), switching the selection of the reference value selectors 18 from the temperature detected by the main thermocouple 3 to the steady-state reference temperatures stored in the steady-state reference temperature memories 17 after the temperatures detected by the individual thermocouples 3 reach the steady-state reference temperature makes it possible to stabilize the temperatures in the regions in which the individual sub-thermocouples are placed to the steady-state reference temperature, offering an advantage of being able to prevent the oscillation because of the response delay and the like.

In-contrast, it can operate the individual sub-control loops 7 in accordance with their own steady-state reference temperatures at first to make them arrive at the steady-state reference temperatures early, and then switch the individual sub-control loops 7 to the temperature detected by the main thermocouple 3 at a temperature close to the steady-state reference temperature, offering an advantage of being able to stabilize the temperatures at the steady-state reference temperature earlier.

Embodiment 3

Figure 11:
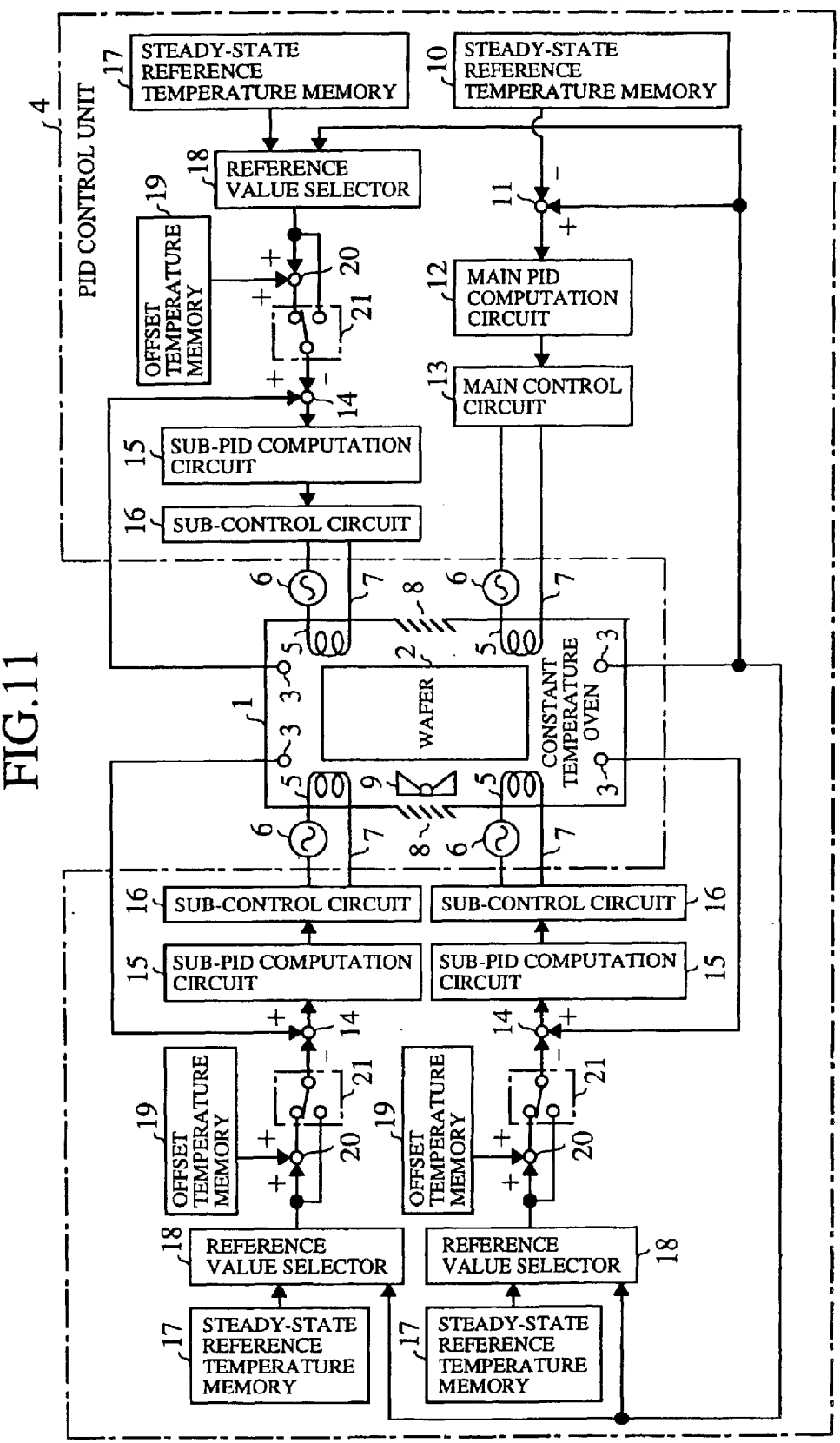
FIG. 11 is a block diagram showing a configuration of a PID control system of an embodiment 3 in accordance with the present invention.

FIG. 11 is a block diagram showing a configuration of an embodiment 3 of the PID control system in accordance with the present invention. In FIG. 11, reference numerals 19 each designate an offset temperature memory for prestoring an offset value; 20 each designate an adder for adding the offset value to the output value of the reference value selector 18; and 21 each designate an offset selector for selecting one of the resultant sum of the adder 20 and the output value of the reference value selector 18, and supplies it to the sub-subtracter 14 as a subtrahend. Since the remaining configuration is the same as that of the foregoing embodiment 2, the description thereof is omitted here.

Next, the operation will be described.

Each adder 20 adds the offset value prestored in the offset temperature memory 19 to the output value of the reference value selector 18. Each offset selector 21 selects one of the resultant sum of the adder 20 and the output value of the reference value selector 186 and supplies it to the sub-subtracter 14 as the subtrahend. Each sub-subtracter 14 subtracts the subtrahend from the temperature detected by the sub-thermocouple 3, and outputs the resultant sub-deviation temperature. Accordingly, the sub-subtracter 14 can be supplied with one of the temperature detected by the main thermocouple 3, the temperature equal to the sum of the temperature detected by the main thermocouple 3 and the specified offset value, the steady-state reference temperature, and the temperature equal to the sum of the steady-state reference temperature and the specified offset value. Since the remaining operation is the same as that of the foregoing embodiment 2, the description thereof is omitted here.

In this way, the present embodiment enables the individual sub-control loops 7 to operate considering the offset values. As a result, it can control the individual sub-control loops 7 in the same manner in response to the temperature detected by the main thermocouple 3, or control them such that they maintain fixed temperature differences in response to the offset values of the offset temperature memories 19, and furthermore it can effectively suppress the oscillation of the sub-control systems by compensating for the delays produced in practice, by setting the response delays and the like of the sub-control systems as the offset values.

Figure 12:
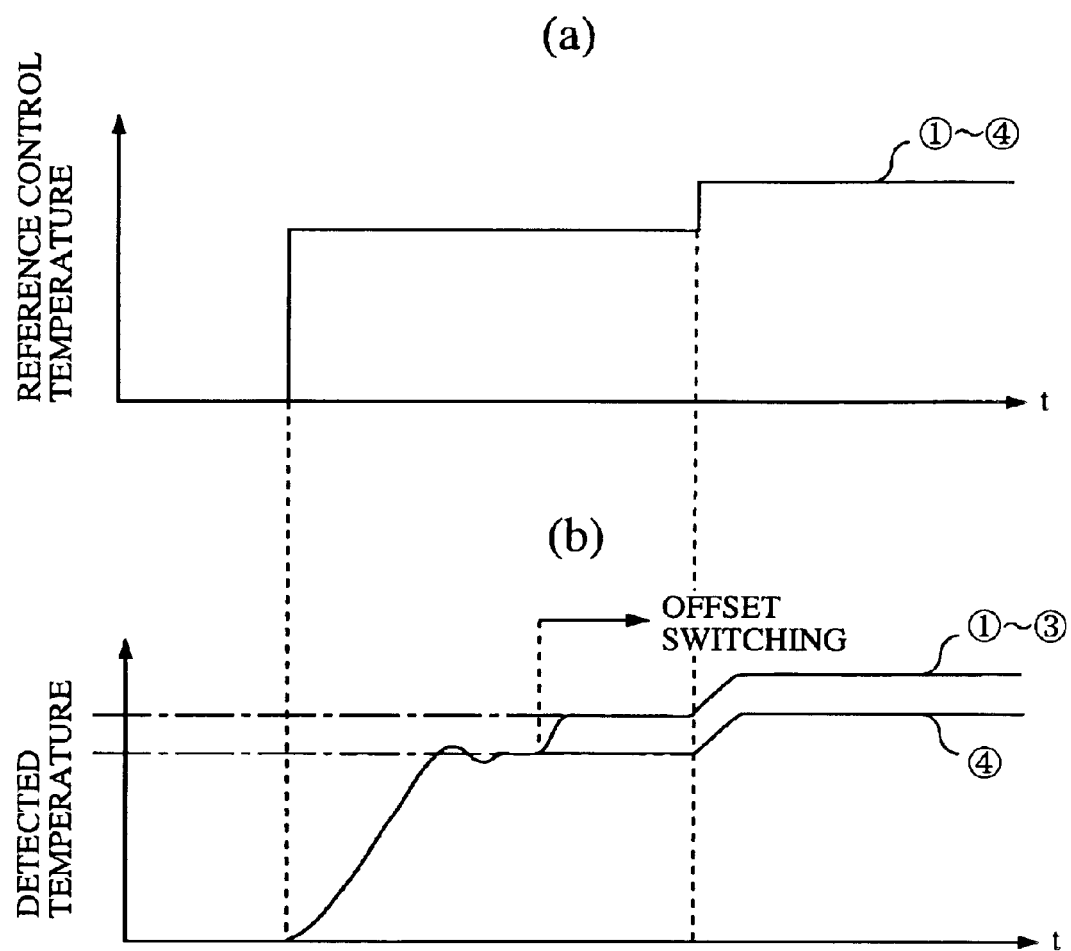
FIG. 12 is a diagram illustrating an example of the temperature control by the embodiment 3 in accordance with the present invention.

FIG. 12 is a diagram illustrating an example of the temperature control in the embodiment 3 in accordance with the present invention. FIG. 12(a) illustrates a waveform of the reference control temperature, and FIG. 12(b) illustrates waveforms of the temperatures detected by the individual thermocouples 3, ..., and 3, in which ①–④ designate the waveforms of the temperatures detected by the individual thermocouples 3. As illustrated in this figure, the control that maintains the fixed temperature difference is possible by causing the offset selectors 21 to switch their selection from the output value of the reference value selector 18 to the resultant sum of the adder 20 in the course of the temperature control cycle.

Embodiment 4

Figure 13:
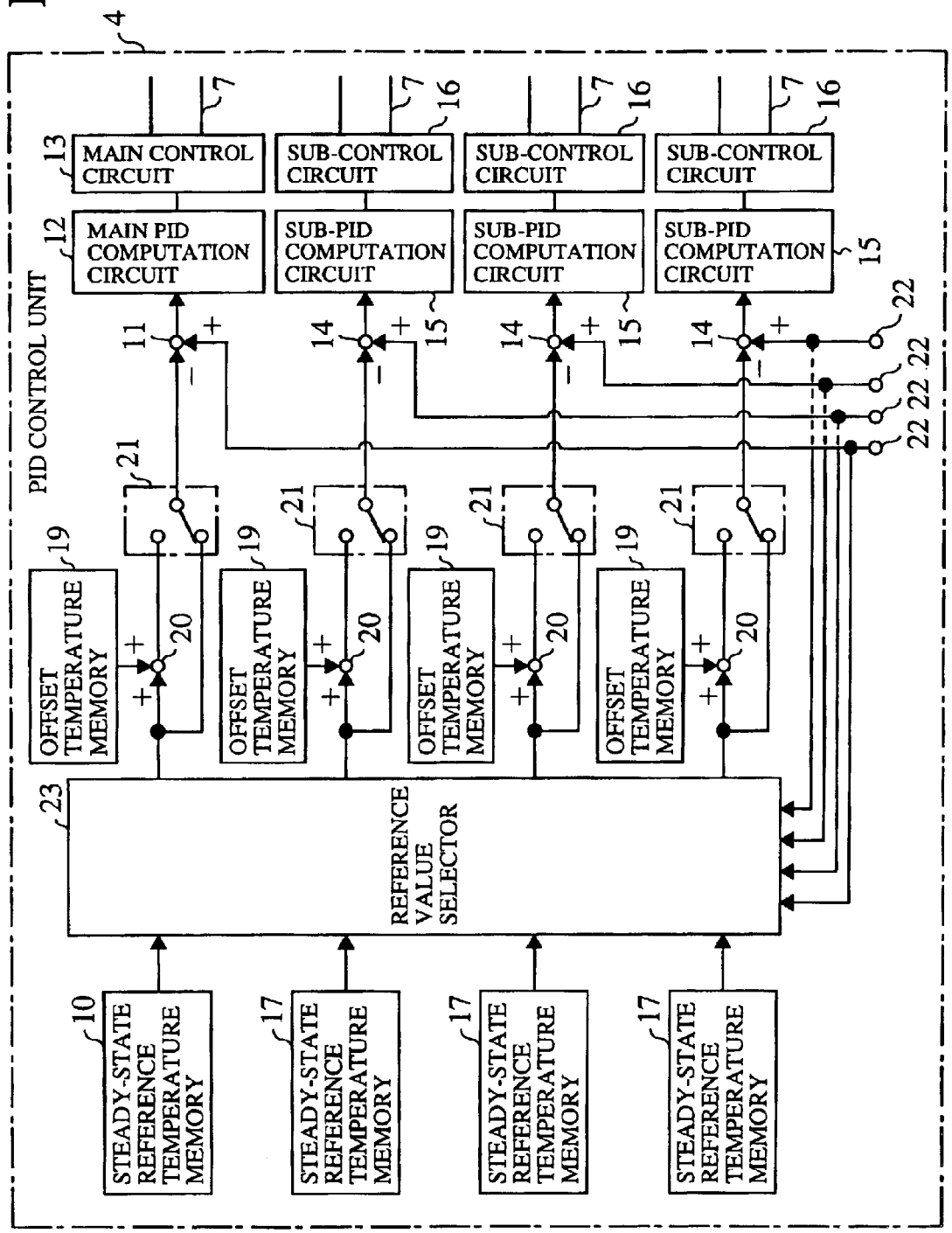
FIG. 13 is a block diagram showing a configuration of a PID control unit of an embodiment 4 in accordance with the present invention.

FIG. 13 is a block diagram showing a configuration of a PID control unit 4 of an embodiment 4 in accordance with the present invention. In FIG. 13, reference numerals 22 each designate an input terminal to which the detected temperature is supplied from the thermocouple 3. The reference numeral 23 designates a reference value selector (second selector) that is connected to all the steady-state reference temperature memories 10, 17, ..., and 17 and to all the input terminals 22, ..., and 22, and that freely switches among them the subtrahend input sources to the individual subtracters 11 and the input sources to the individual adders 20 in response to the preset by a program or the like. Since the remaining configuration is the same as that of the foregoing embodiment 3, the description thereof is omitted here.

Next, the-operation will be described.

In response to the preset of the control program and the like, the reference value selector 23 selects each one of individual pairs of all the steady-state reference temperature memories 10, 17, ..., and 17 and all the input terminal 22, ..., and 22, and supplies the selected values to the individual subtracters 11 (14) and the like as the subtrahend. Each adder adds the value of the corresponding offset temperature memory 19 to the supplied value, and each subtracter 11 (14) subtracts the subtrahend from the temperature detected by the thermocouple 3 fed from the corresponding input terminal 22 and supplies the resultant value to one of the PID control circuits. Since the remaining operation is the same as that of the foregoing embodiment 3, the description thereof is omitted here.

Thus, the subtrahends to be supplied to the subtracters 14 can be selected from among the plurality of steady-state reference temperature memories 10, 17, ..., and 17 and the plurality of input terminals 22, ..., and 22 so that the individual PID computation circuits 12 (15) can operate in response to the selected values. This offers an advantage of being able to configure a very versatile system capable of controlling the PID computation circuits 12 and 15 in connection with each other or controlling them separately, without adding any new configuration by appropriately combining them for an application purpose. For example, as the steady-state reference temperatures of the sub-PID control circuits 15, it is possible to select and use either the preset temperatures of the steady-state reference temperature memories 17 corresponding to the sub-PID control circuits 15, or the detection values of any of the other PID control circuits which can be specified arbitrary.

As a result, the present embodiment 4 can conduct the following control. For example, after presetting the steady-state reference temperature in the steady-state reference temperature memory 10, the present embodiment initially controls the main control loop 7 in response to the preset temperature and the remaining sub-control loops 7 in response to the temperature detected by the main thermocouple 3 corresponding to the main control loop 7, and then after entering a stable state, it controls all the control loops 7, ..., and 7 in response to the steady-state reference temperature of the steady-state reference temperature memory 10. Thus, as the foregoing embodiment 2, the present embodiment 4 can effectively prevent the oscillation because of the inter-channel interference caused by disturbance or response delay. In addition, it enables the control program operating at a higher rank to carry out these processings without paying any attention to the plurality of steady-state reference temperature memories. As a result, the present embodiment 4 offers an advantage of enabling the control program to be simpler and easier-to-understand than that of the foregoing embodiment 2.

Incidentally, although the embodiments in accordance with the present invention are described by way of example of the PID control system including the PID computation circuits 12 and 15 in the foregoing description, this is not essential. For example, an IMC control system can be configured by only replacing the PID computation circuits 12 and 15 by an IMC control circuit. In addition, it is obvious that the IMC control system can achieve the control in such a manner that the detected temperature converges to the steady-state reference temperature. Furthermore, although the foregoing description is made by way of example of controlling the wafer temperature suitably in the process of fabricating semiconductor devices such as CCD sensors, this is not essential. For example, it is obvious that the present invention is applicable to whatever systems that control the detection value of the state of a controlled system in such a manner that it converges to a steady-state reference value.

Embodiment 5

Figure 14:
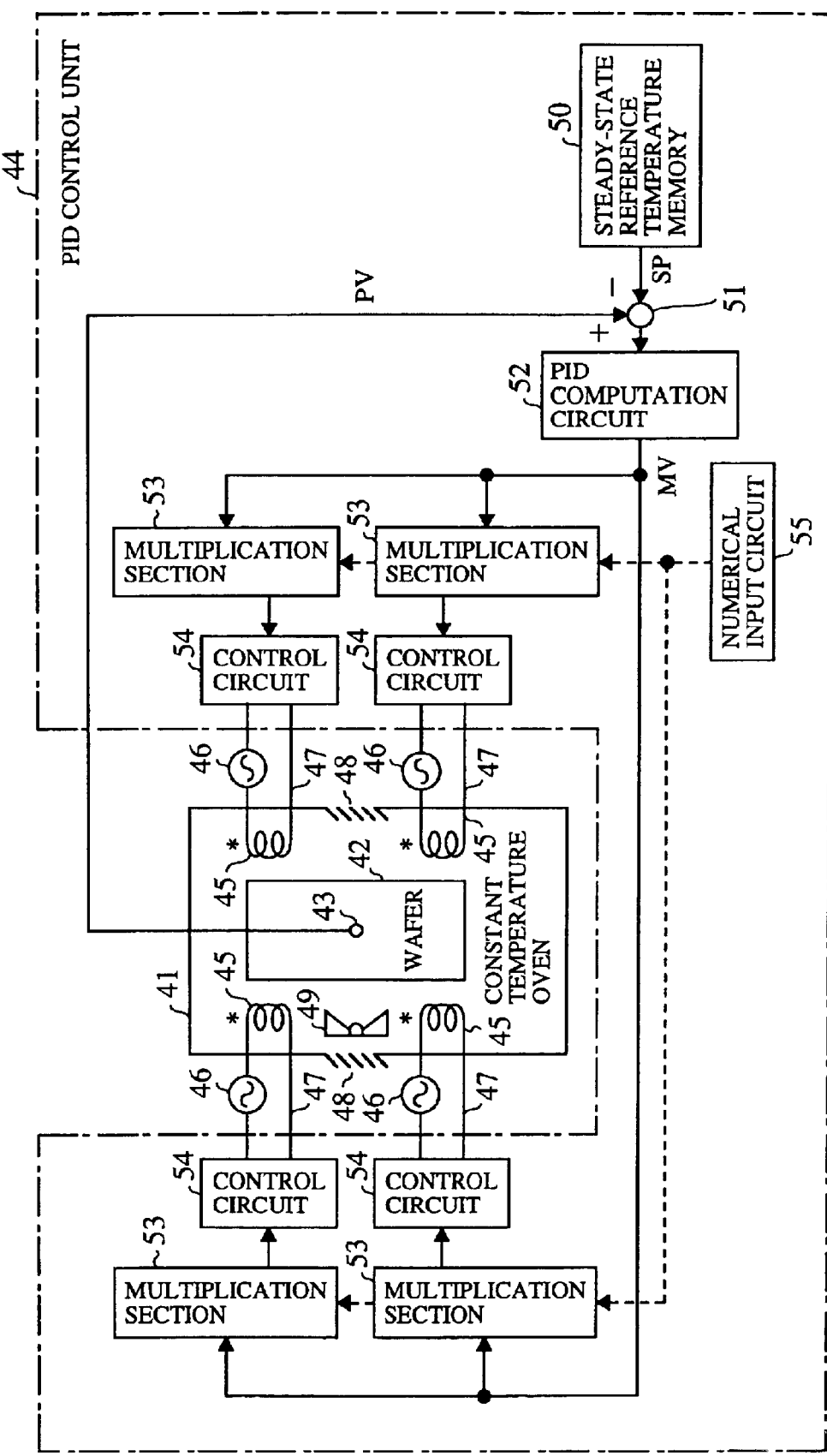
FIG. 14 is a block diagram showing a configuration of a PID control system of an embodiment 5 in accordance with the present invention.

FIG. 14 is a block diagram showing a configuration of a PID control system of an embodiment 5 in accordance with the present invention. In FIG. 14, the reference numeral 41 designates a constant temperature oven; and 42 designates a wafer for CCD sensors; which is placed in the constant temperature oven 41. The reference numeral 43 designates a thermocouple (detecting section) that is placed at the center of the constant temperature oven 41 for detecting the temperature; and 44 designates a PID control unit for carrying out the specified control using the temperature detected by the thermocouple 43. Reference numerals 45 each designate a heater (control section) provided near the wafer 42; 46 designate power supplies (control section) provided in a one-to-one correspondence with the heaters 45; 47 each designate a control loop (control section) for connecting one of the heaters 45 and one of the power supplies 46 to the PID control unit 44 in series; and. 48 designate vents opened in a wall of the constant temperature oven 41. The reference numeral 49 designates a fan provided inside the vent 48.

In the PID control unit 44, the reference numeral 50 designates a steady-state reference temperature memory for storing a steady-state reference temperature; 51 designates a subtracter (computation section) for subtracting the steady-state reference temperature from the temperature detected by the thermocouple 43, and for outputting a deviation temperature; and 52 designates a PID computation circuit (computation section) for outputting a first manipulated variable based on the PID control computation, which will converge the deviation temperature to zero. Reference numerals 53 each designate a multiplication section for multiplying the first manipulated variable by a predetermined ratio coefficient, and for outputting a second manipulated variable; and 54 each designate a control circuit (control section) for receiving the second manipulated variable, and for carrying out the energizing control of one of the individual control loops 47 in response to the second manipulated variable. The reference numeral 55 designates a numerical input circuit (ratio coefficient input section) that includes a numeric keypad, and sets numerical values to the plurality of multiplication sections 53, . . . , and 53 via the numeric keypad as the ratio coefficients.

Next, the operation will be described.

Figure 15:
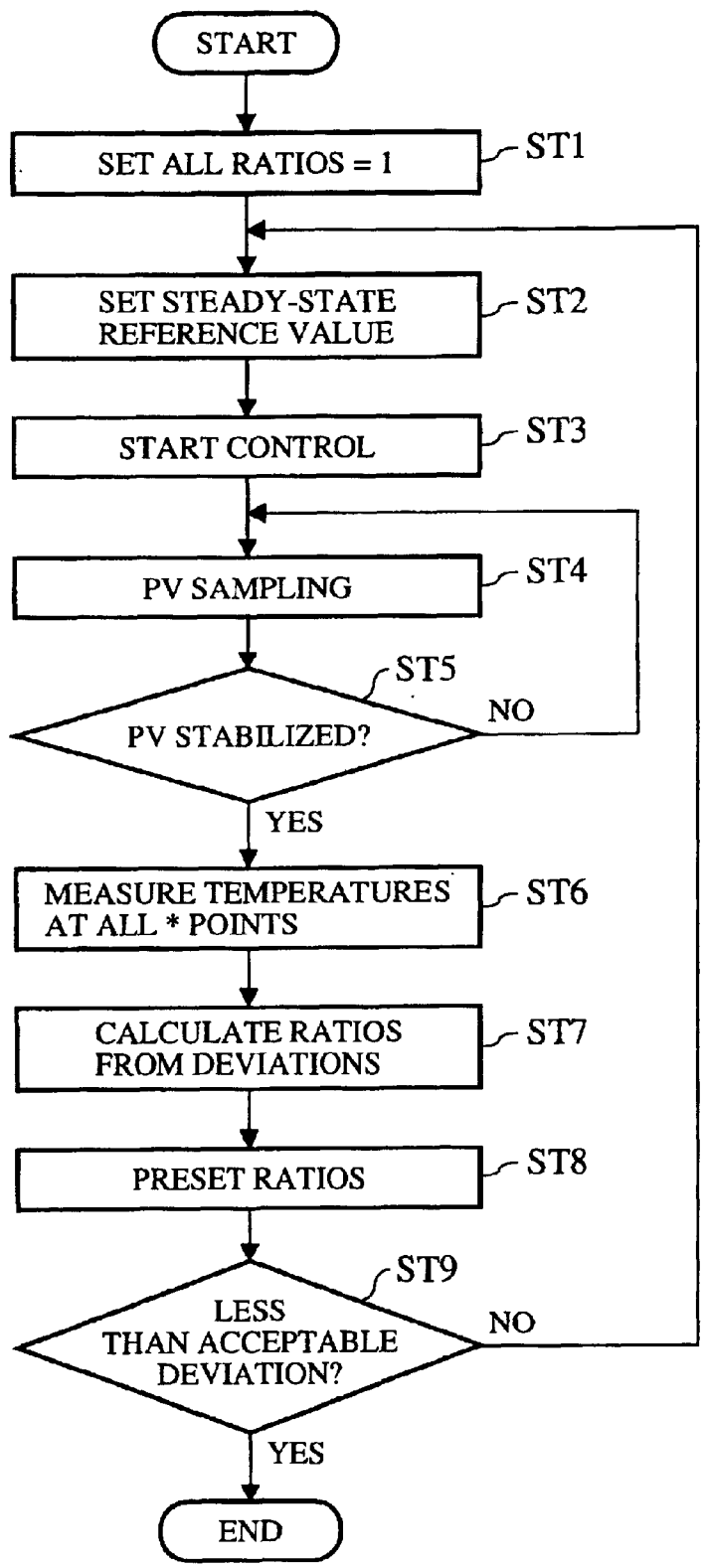
FIG. 15 is a flowchart illustrating a procedure up to the setting of ratio coefficients of the embodiment 5 in accordance with the present invention.

FIG. 15 is a flowchart illustrating a procedure up to the setting of the ratio coefficients of the embodiment 5 in accordance with the present invention. In FIG. 15, step ST1 is an initializing-step of setting a ratio coefficient "1" to all the multiplication sections 53, . . . , and 53 as an initial value. Step ST2 is a steady-state reference temperature preset step of setting a desired steady-state reference temperature (100 degrees, for example) to the steady-state reference temperature memory 50. Step ST3 is a control start step of beginning the temperature control under these established conditions. Step ST4 is a sampling step of measuring the temperature detected by the thermocouple 43. Step ST5 is a stability decision step of making a decision as to whether the temperature detected by the thermocouple 43 is stabilized at the steady-state reference temperature in response to the difference between the detected temperature and steady-state reference temperature. Step ST6 is a zone temperature measurement step of measuring the temperatures near the individual heaters 45 (temperatures at the positions indicated by the asterisks in FIG. 14, for example) in a stable state in which the detected temperature is stabilized at the steady-state reference temperature. Step ST7 is a ratio coefficient computation step of computing the ratio coefficients corresponding to the deviations of the temperatures of the individual zones against the steady-state reference temperature. Step ST8 is a ratio coefficient preset step of setting the individual ratio coefficients to the individual multiplication sections 53. Step ST9 is a setting checking step of carrying out the temperature control under a new ratio coefficient combination and of making a decision as to whether the deviations of the temperatures near the individual heaters 45 at that time are within an acceptable deviation or not.

In the setting processing of the ratio coefficients like this, assume-that the steady-state reference temperature is 100 degrees, the measured temperature of a zone is 120 degrees, and the first manipulated variable at that time is 25% of the full scale, for example. In this case, the ratio coefficient can be obtained as "0.8" from the following equations (1) and (2).

$$\{120(\text{degrees}) - 100(\text{degrees})\} / \{100(\text{degrees}) \times 100(\%) / 25(\%)\} = 20/400 = 5(\%) \quad \text{Eq. 1}$$

$$\text{RATIO} = \{25(\%) - 5(\%)\} / 25(\%) = 0.8 \quad \text{Eq. 2}$$

After setting the thus calculated ratio coefficients in the individual multiplication sections 53 from the numerical input circuit 55, the specified wafer 42 is actually placed in the constant temperature oven 41. Then, the temperature control program is executed by a higher level system of the PID control unit 44 in that condition in order to store the temperature setting by the program into the steady-state reference temperature memory 50 as steady-state reference temperature. The temperature is altered as needed to manage and control the temperature of the wafer 42. More specifically, once the steady-state reference temperature memory 50 stores the steady-state reference temperature, the subtracter 51 subtracts the steady-state reference temperature from the currently detected temperature by the thermocouple 43. The PID computation circuit 52 outputs the first manipulated variable based on the PID control computation for converging the deviation temperature to zero. The multiplication sections 53 each output the second manipulated variable by multiplying the first manipulated variable by the ratio coefficient set therein. The control circuits 54 each carry out the energizing control of one of the control loops 47 in response to the second manipulated variable. The energizing control is carried out in such a manner that the on-time (duty) per unit time increases with an increase of the second manipulated variable during the temperature rise, for example. In contrast, during the temperature fall, the control is carried out in such a manner that the on-time (duty) per unit time is reduced with an increase of the second manipulated variable.

Thus, the energized durations of the heaters 45, . . . , and 45 are controlled in response to the output of the single PID computation circuit 52. However, since the energized durations of the individual heaters 45 can be altered by varying the ratio coefficients, the temperature rise and temperature fall can be achieved without bringing about the temperature difference between the zones, even if the heaters 45 have variations in their heat dispersion characteristics.

Accordingly, only setting the steady-state reference temperature into the steady-state reference temperature memory 50 enables the temperatures of the individual zones to rise up to the steady-state reference temperature along the same curve of the temperature rise. In addition, since the temperatures can be stabilized at the steady-state reference temperature without any temperature difference between the zones, the occurrence of the overshoot and undershoot after reaching the steady-state reference temperature can be effectively suppressed. Furthermore, the present embodiment 5 offers an advantage of being able to control the temperature of the wafer 42 appropriately in spite of the disturbance from the fan 49 or the like in the process of fabricating the wafer 42 of the semiconductor devices such as the CCD sensors.

Embodiment 6

Figure 16:
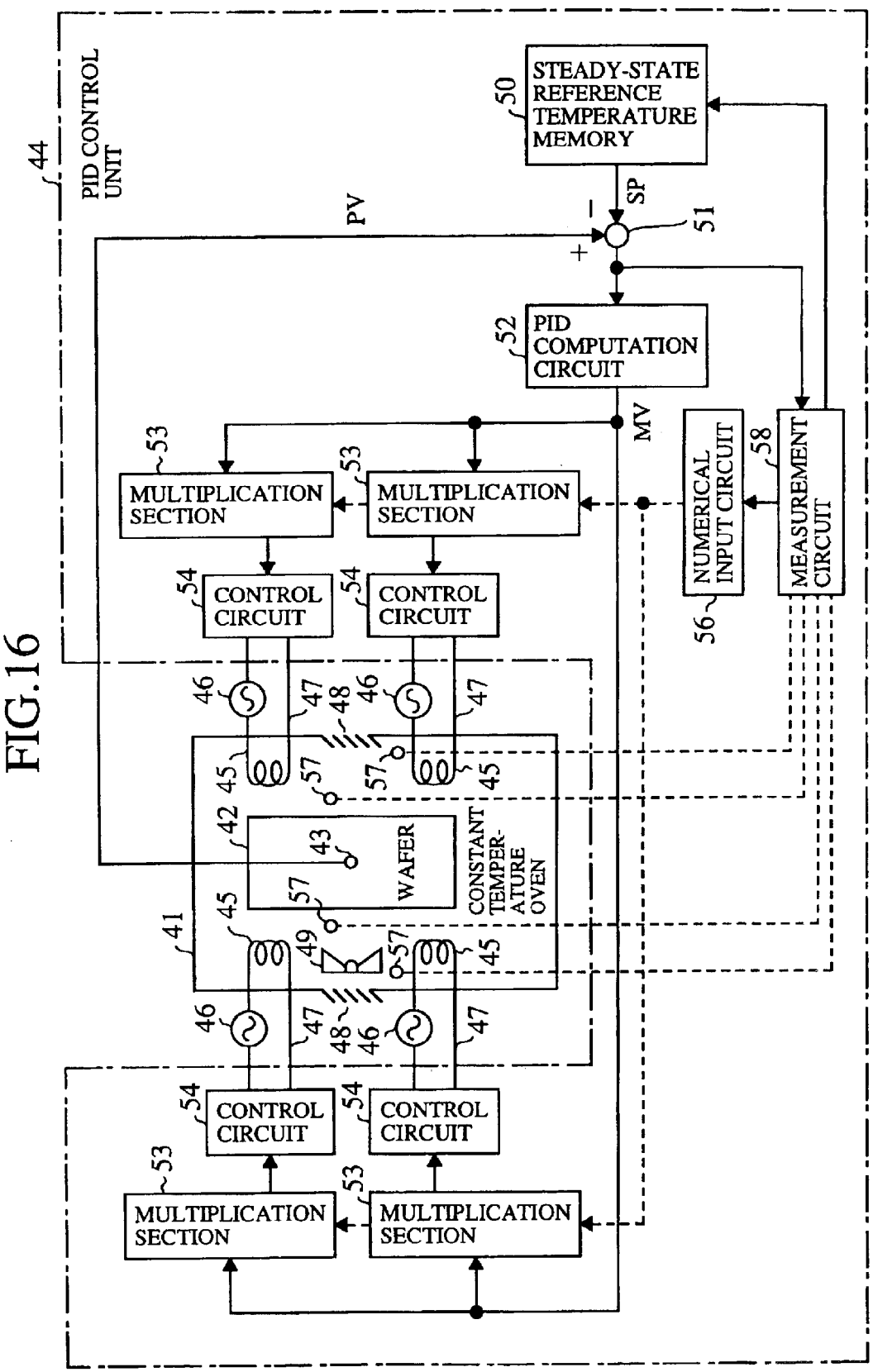
FIG. 16 is a block diagram showing a configuration of a PID control system of an embodiment 6 in accordance with the present invention.

FIG. 16 is a block diagram showing a configuration of a PID control system of an embodiment 6 in accordance with the present invention. In FIG. 16, the reference numeral 56 designates a numerical input circuit (ratio coefficient preset section) for presetting ratio coefficients into the individual multiplication sections 53 in response to the input. Reference numerals 57 each designate a thermocouple (detected temperature input section) placed near one of the individual heaters 5. The reference numeral 58 designates a measurement circuit (ratio coefficient preset section) for receiving temperatures detected by the plurality of thermocouples 57, ..., and 57, for computing the ratio coefficients to be set into the individual multiplication sections 53 using the temperatures detected by the individual thermocouples 57, and for setting them in the individual multiplication sections 53 via the numerical input circuit 56. Since the remaining configuration is the same as that of the foregoing embodiment 5, the description thereof is omitted here.

Next, the operation will be described.

The measurement circuit 58 calculates the ratio coefficients to be set into all the multiplication sections 53, ..., and 53 by executing the procedure illustrated in a flowchart of FIG. 15, and sets them in the individual multiplication sections 53 through the numerical input circuit 56. Since the remaining operation is the same as that of the foregoing embodiment 5, the description thereof is omitted here.

The present embodiment 6 is thus equipped with the measurement circuit 58 in the PID control unit 44, and automates the processing from the measurement to the setting. Thus, the present embodiment 6 has an advantage over the foregoing embodiment 1 that it enables a setting operator to carry out the optimum setting under a use environment by only conducting the measurement under the use environment, thereby being able to sharply increase the convenience of the system.

Embodiment 7

Figure 17:
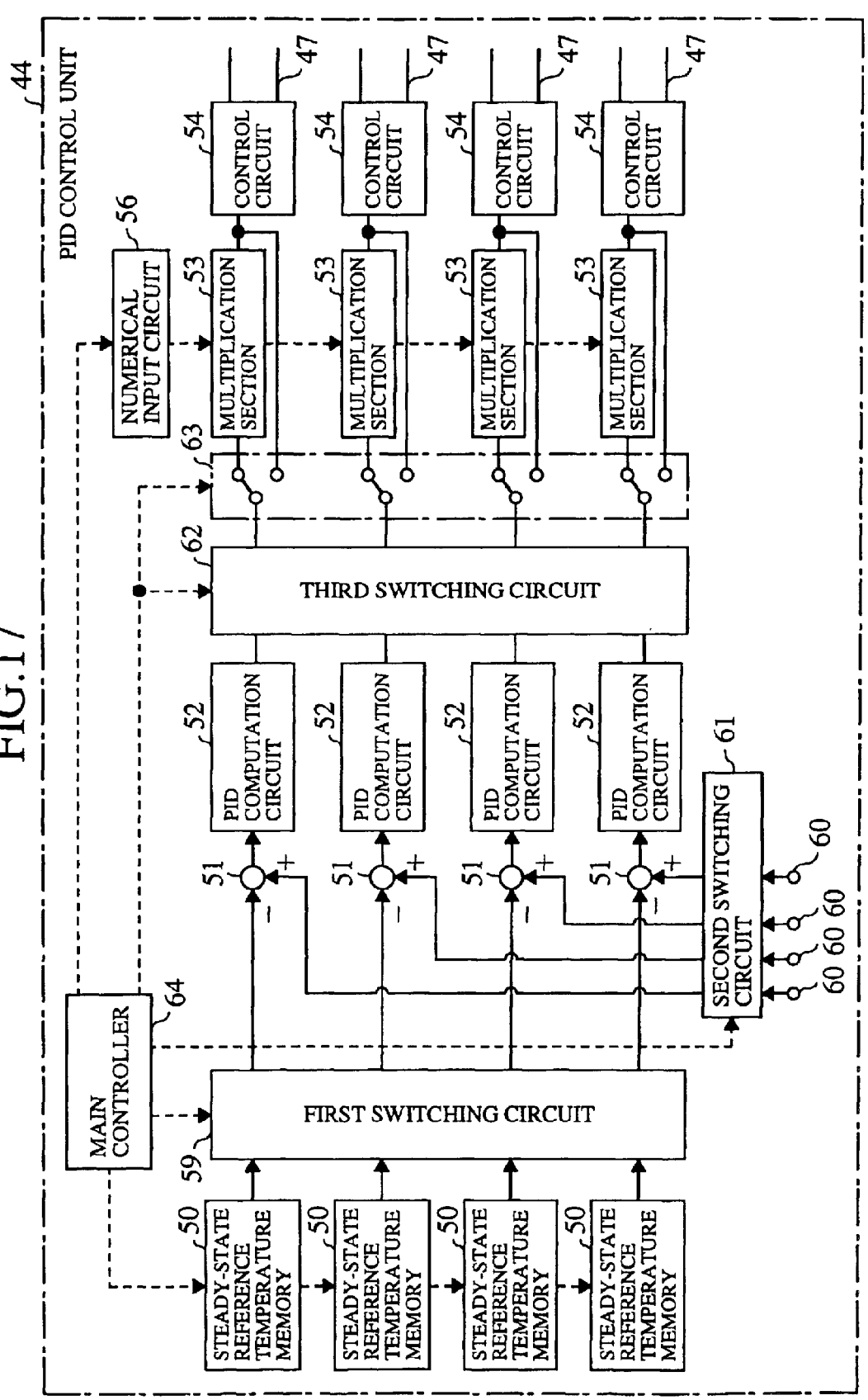
FIG. 17 is a block diagram showing a configuration of a PID control unit of an embodiment 7 in accordance with the present invention.

FIG. 17 is a block diagram showing a configuration of a PID control unit 44 of an embodiment 7 in accordance with the present invention. The PID control unit 44 includes the same number (four in FIG. 17) of steady-state reference temperature memories 50, subtracters 51, PID computation circuits 52 and control circuits 54. In FIG. 17, the reference numeral 59 designates a first switching circuit for freely switching the subtrahend input sources to the individual subtracters 51 among the plurality of steady-state reference temperature memories 50, ..., and 50. Reference numerals 60 each designate an input terminal for receiving a detected temperature from one of the thermocouples. The reference numeral 61 designates a second switching circuit for freely switching the minuend input sources to the individual subtracters 51 among the plurality of input terminals 60, ..., and 60; 62 designates a third switching circuit (first selector) for freely switching the input sources to the individual multiplication sections 53 to the plurality of PID computation circuits 52, ..., and 52; 63 designates a fourth switching circuit (second selector) for freely switching the input sources to the individual control circuits 54 between the multiplication sections 53 and the third switching circuit 62; and 64 designates a main controller for setting the computed ratio coefficients to all the multiplication sections 53, ..., and 53 through the numerical input circuit 56, and for controlling the switching setup of the four switching circuits 59, 61, 62 and 63 in accordance with the temperature control program. Since the remaining configuration is the same as that of the foregoing embodiment 5, the description thereof is omitted here.

The main controller 64 controls the switching of the first switching circuit 59 such that the individual subtracters 51 are supplied with the steady-state reference temperatures from the different steady-state reference temperature memories 50, ..., and 50, or that all the subtracters 51, ..., and 51 are supplied with the steady-state reference temperature of the same steady-state reference temperature memory 50. Likewise, it controls the switching of the second switching circuit 61 such that the individual subtracters 51 are supplied with the different detected temperatures, or that all the subtracters 51, ..., and 51 are supplied with the same detected temperature. Accordingly, the individual subtracters 51 can subtract the same steady-state reference temperature from the same detected temperature, or subtract the different steady-state reference temperatures from the different detected temperatures.

In addition, the main controller 64 controls the switching of the third switching circuit 62 such that the individual multiplication sections 53 are supplied with the different first manipulated variables, or that all the multiplication sections 53, ..., and 53 are supplied with the same first manipulated variable. Accordingly, the individual multiplication sections 53 can multiply the same first manipulated variable by the ratio coefficients to output the second manipulated variables, or multiply the different first manipulated variables by the ratio coefficients to output the second manipulated variables.

Furthermore, the main controller 64 controls the switching of the fourth switching circuit 63 such that the individual control circuits 54 are supplied with the outputs (third manipulated variables) of the multiplication sections 53, or with the output (second manipulated variables) of the third switching circuit 62. Thus, the individual control circuits 54 can carry out the same control or separate control.

The foregoing switching control can be made freely and independently. Accordingly, the present embodiment 7 can perform the following control in the same manner as the foregoing embodiment 6. It can control all the control circuits 54, ..., and 54 in response to the output of the single PID computation circuits 52 based on the single detected temperature, or control the individual control circuits 54 in response to the outputs of the different PID computation circuits 52. Utilizing the combination of these control schemes can control the entire system to have a uniform temperature, or part of the system to have an independent temperature without adding any new control circuit 54. Thus, the present embodiment 7 offers an advantage of being able to greatly increase the convenience of the system. In particular, controlling all the control loops 47 in response to the steady-state reference value of the single steady-state reference temperature memory 50 in the stable state enables the control program operating at the higher rank to carry out its control without considering the plurality of steady-state reference temperature memories 50, . . . , and 50. As a result, the present embodiment 7 offers an advantage of being able to make the control program simpler and easier to understand.

In addition, the present embodiment 7 is configured such that the input sources to the individual control units 54 are switched between the PID computation circuits 52 (third switching circuit 62) and the multiplication sections 53. Accordingly, it is possible, for example, to carry out the measurement for revising the ratio coefficients without correcting the values which are preset in the multiplication sections 53, to unity each time. As a result, the measurement of the new ratio coefficients is possible without considering the multiplication sections 53 on all such occasions. Besides, the previous values of the ratio coefficients can be left so that the present embodiment 7 offers an advantage of being able to provide a system capable of greatly increasing the convenience at the initialization or at revising the setting.

Furthermore, since it can supply the outputs of the plurality of PID computation circuits 52, . . . , and 52 to the plurality of multiplication sections 53, . . . , and 53, it can control the temperatures group by group consisting of a plurality of zones which are created by dividing the constant temperature oven 41.

Embodiment 8

Figure 18:
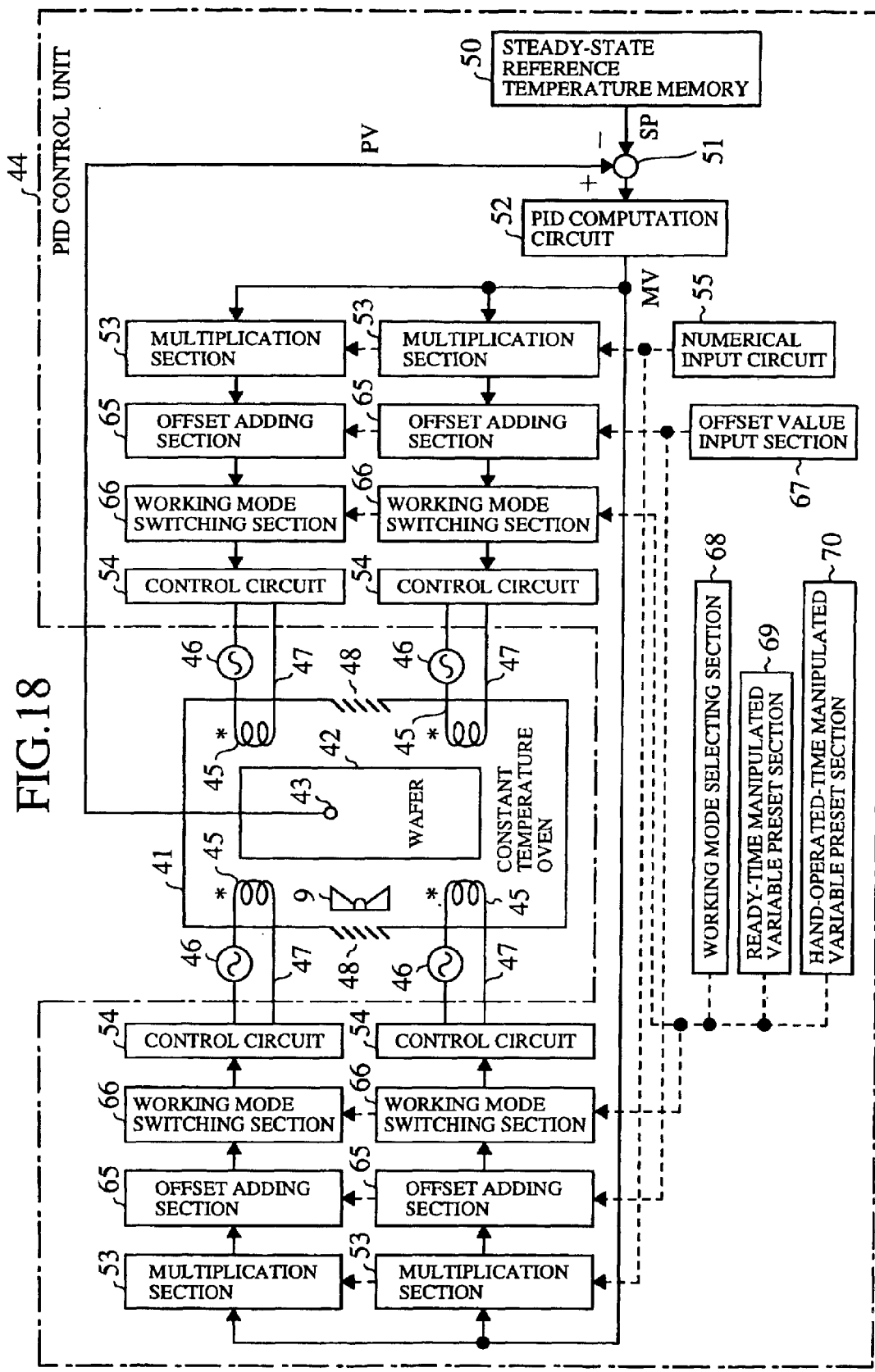
FIG. 18 is a block diagram showing a configuration of a PID control system of an embodiment 8 in accordance with the present invention.

FIG. 18 is a block diagram showing a configuration of a PID control system of an embodiment 8 in accordance with the present invention. In FIG. 18, reference numerals 65 each designate an offset adding section for adding an offset value to the second manipulated variable output from one of the multiplication sections 53, and for outputting the resultant sum as a third manipulated variable; and 66 designates a working mode switching section for receiving an operation mode preset signal, and for supplying the corresponding control circuit 54 with the third manipulated variable and the like in response to the operation mode. The reference numeral 67 designates an offset value input section for receiving an offset value within a range from 100% to 200%, for example, which is input by the key operation of a control device, and for presetting it to the plurality of offset adding sections 65, . . . , and 65; 68 designates a working mode selecting section for outputting, as an operation mode preset signal, information about the working mode that is selected from four working modes consisting of combinations of one of a manual mode and automatic mode with one of a ready mode and running mode; 69 designates a ready-time manipulated variable preset section for presetting a manipulated variable used in a ready mode, and for supplying it to the working mode switching sections 66, . . . , and 66; and 70 designates a hand-operated-time manipulated variable preset section for presetting a manipulated variable used in the manual mode, and for supplying it to the working mode switching sections 66, . . . , and 66.

The working mode switching sections 66 supply the control circuits 54 with the following manipulated variables. When the working mode switching sections 66 receive the "manual mode×ready mode" as the operation mode preset signal, they supply the control circuits 54 with the manipulated variable fed from the hand-operated-time manipulated variable preset section 70. When the working mode switching sections 66 receive the "manual mode×running mode" as the operation mode preset signal, they supply the control circuits 54 with the manipulated variable fed from the hand-operated-time manipulated variable preset section 70. When the working mode switching sections 66 receive the "automatic mode×ready mode" as the operation mode preset signal, they supply the control circuits 54 with the manipulated variable fed from the ready-time manipulated variable preset section 69. When the working mode switching sections 66 receive the "automatic mode×running mode" as the operation mode preset signal, they supply the control circuits 54 with the third manipulated variables. Since the remaining configuration is the same as that of the foregoing embodiment 5, the description thereof is omitted here.

Next, the operation will be described.

When a manipulation for the working mode selecting sections 68 is performed in the active state of the PID control system, the information on the working mode, which is selected as one of the combinations of the manual mode and automatic mode with the ready mode and running mode, is input to all the working mode switching sections 66 as the operation mode preset signal. According to the preset of the operation mode, each working mode switching section 66 selects one of the third manipulated variable, manipulated variable fed from the hand-operated-time manipulated variable preset section 70 and manipulated variable fed from the ready-time manipulated variable preset section 69, and supplies the selected manipulated variable to the control circuit 54.

Accordingly, presetting the "manual mode×ready mode" or "manual mode X running mode" together with presetting the manipulated variable to the hand-operated-time manipulated variable preset section 70, for example, causes all the control circuits 54 to carry out the temperature control in response to the manipulated variable. Presetting the "automatic mode×ready mode" together with presetting the manipulated, variable in the ready-time manipulated variable preset section 69 causes all the control circuits 54 to carry out the temperature control in response to the manipulated variable. Presetting the "automatic mode×running mode" causes the individual control circuits 54 to carry out the temperature control in response to the third manipulated variables.

Furthermore, inputting the offset value via the offset value input section 67 in the preset state of the "automatic mode× running mode" causes the offset value to be set in the offset adding sections 65. Thus, the offset adding sections 65 output the sums of the second manipulated variables and the offset value as the third manipulated variables.

Incidentally, the embodiments in accordance with the present invention have been described by way of example of the PID control system including the PID computation circuit(s) 52 in the foregoing description, this is not essential. For example, it is possible to configure an IMC control system by only replacing the PID computation circuit 52 by an IMC control circuit. It is obvious that even the IMC control system can carry out the control in such a manner that the detected temperature converges to the steady-state reference temperature. In addition, although the foregoing description is made by way of example of controlling the wafer temperature appropriately in the process of fabricating the semiconductor devices such as CCD sensors, this is not essential. It is obvious that the present invention is applicable to any systems that carry out the control in such a manner that a detection value of the controlled system converges to a steady-state reference value.

Embodiment 9

Figure 19:
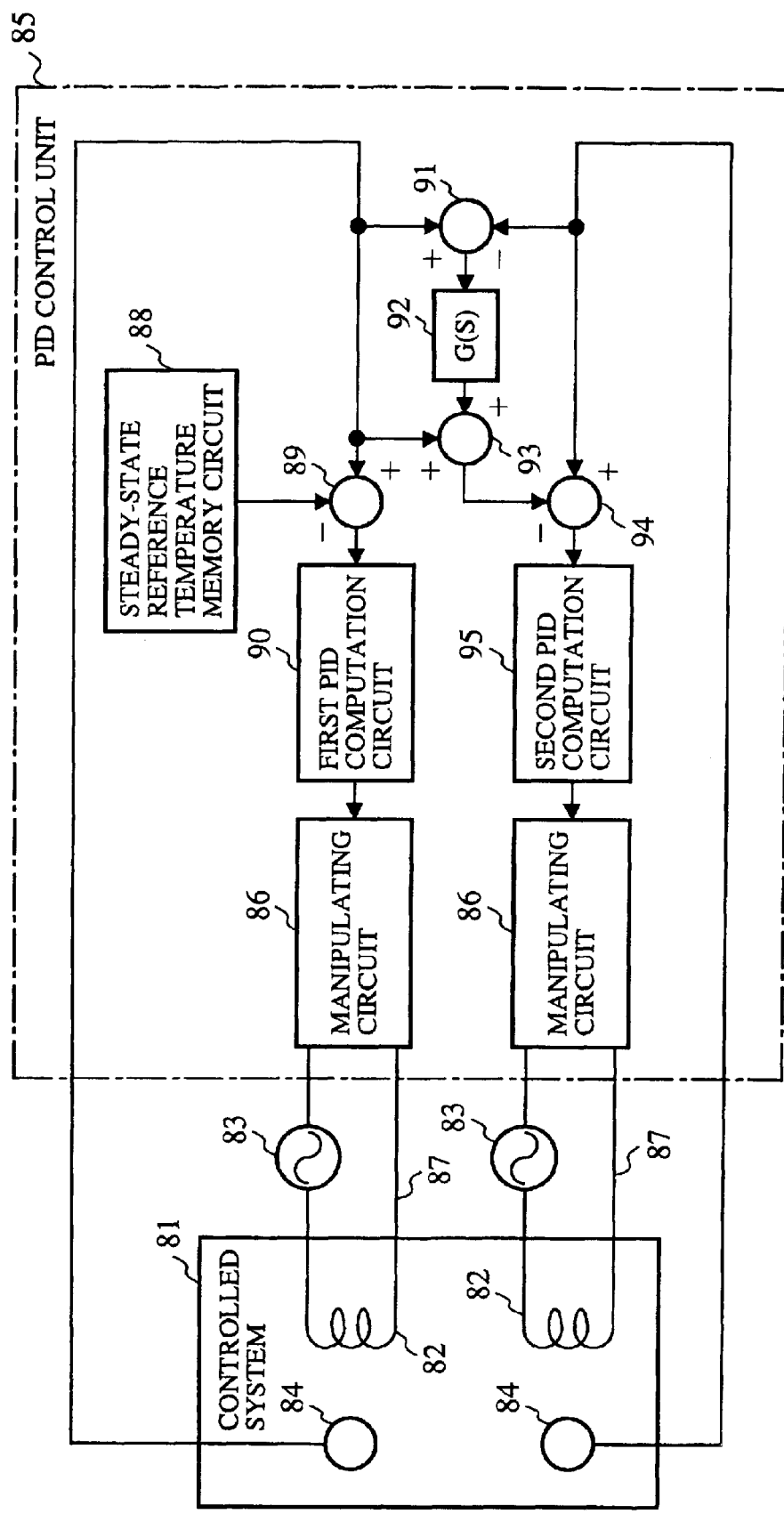
FIG. 19 is a block diagram showing a configuration of a PID control system of an embodiment 9 in accordance with the present invention.

FIG. 19 is a block diagram showing a configuration of a PID control system of an embodiment 9 in accordance with the present invention. In FIG. 19, the reference numeral 81 designates a controlled system such as a constant temperature oven. Reference numerals 82 each designate a heater (manipulating section) disposed in the controlled system 81; 83 each designate a heater power supply (manipulating section); and 84 each designate a thermocouple (detecting section) disposed near one of the individual heaters 82, for detecting the temperature of the controlled system 81. The reference numeral 85 designates a PID control unit for controlling the energization of the two heaters 82 using the temperatures detected by the two thermocouples 84.

In the PID control unit 85, reference numerals 86 each designate a manipulating circuit (manipulating section) connected in series with the heater 82 and heater power supply 83; and 87 each designate an energizing control loop (manipulating section) for connecting the heater 82, heater power supply 83 and manipulating circuit 86 in a single loop. The reference numeral 88 designates a steady-state reference temperature memory circuit (control section) for storing the steady-state reference temperature. In the following description, the control path (84, 89, 90, 86, 87, 82) from the thermocouple 84 to the heater 82 drawn in the upper side of FIG. 19 is referred to as a first control loop, whereas the control path (84, 94, 95, 86, 87, 82).from the thermocouple 84 to the heater 82 drawn in the lower side of FIG. 19 is referred to as the second control loop. In addition, the individual components of these control loops are distinguished by the modifiers "first" and "second".

The reference numeral 89 designates a first subtracter (control section) for subtracting the steady-state reference temperature from the first detected temperature, and for outputting the result as a first control deviation; and 90 designates a first PID computation circuit (control section) for carrying out the PID control computation in response to the first control deviation, and for supplying the computation result to the first manipulating circuit 86 as the first manipulated variable. The reference numeral 91 designates a detected temperature subtracter (control section) for subtracting the second detected temperature from the first detected temperature, and for outputting the resultant value as a detected temperature deviation; 92 designates a filter circuit (control section) for performing filtering of the detected temperature deviation, and for outputting a filtered detected temperature deviation; 93 designates a second reference temperature generating adder (control section) for adding the filtered detected temperature deviation to the first detected temperature; 94 designates a second subtracter (control section) for subtracting the sum from the second detected temperature, and for outputting the result as a second control deviation; and 95 designates a second PID computation circuit (control section) for carrying out the PID control computation in response to the second control deviation, and for supplying the computation result to the second manipulating circuit 86 as the second manipulated variable.

Next, the operation will be described.

For example, assume that the steady-state reference temperature of the desired controlled system is set in the steady-state reference temperature memory circuit 88 when the detected temperatures by the two thermocouples 84 and 84 are in a stable state. In this case, the first subtracter 89 subtracts the steady-state reference temperature from the stable first detected temperature, the first PID computation circuit 90 carries out the PID control computation in response to the first control deviation, and the first manipulating circuit 86 carries out the energizing control of the first energizing control loop 87 in response to the first manipulated variable. In this stable state of the detected temperature by the two thermocouples 84 and 84, the energizing control of the second control-loop is not carried out because the second control deviation output from the second subtracter 94 is "0".

As the detected temperature by the first thermocouple 84 increases because of the energizing control by the first control loop, the first subtracter 89 subtracts the steady-state reference temperature from the first detected temperature, and the first control loop carries out the energizing control in response to the new first control deviation. In this case, since only the first heater 82 is energized, a temperature gradient arises in the controlled system 81, which causes the difference between the first detected temperature and second detected temperature. Thus, the following control is carried out in the second control loop. The detected temperature subtracter 91 subtracts the second detected temperature from the first detected temperature. The filter circuit 92 carries out the filtering of the detected temperature deviation. The second reference temperature generating adder 93 adds the filtered detected temperature deviation to the first detected temperature. The second subtracter 94 subtracts the sum from the second detected temperature. The second PID computation circuit 95 carries out the PID control computation in response to the second control deviation. The manipulating circuit 86 carries out the energizing control in accordance with the second manipulated variable.

At the final stage of such control carried out continuously, the energizing of the first control loop is completed at the time when the first detected temperature agrees with the steady-state reference temperature, and the energizing of the second control loop is completed at the time when the first detected temperature agrees with the second detected temperature. As a result, the energizing control is completed at the time when both the first and second detected temperatures become equal to the steady-state reference temperature.

Figure 20:
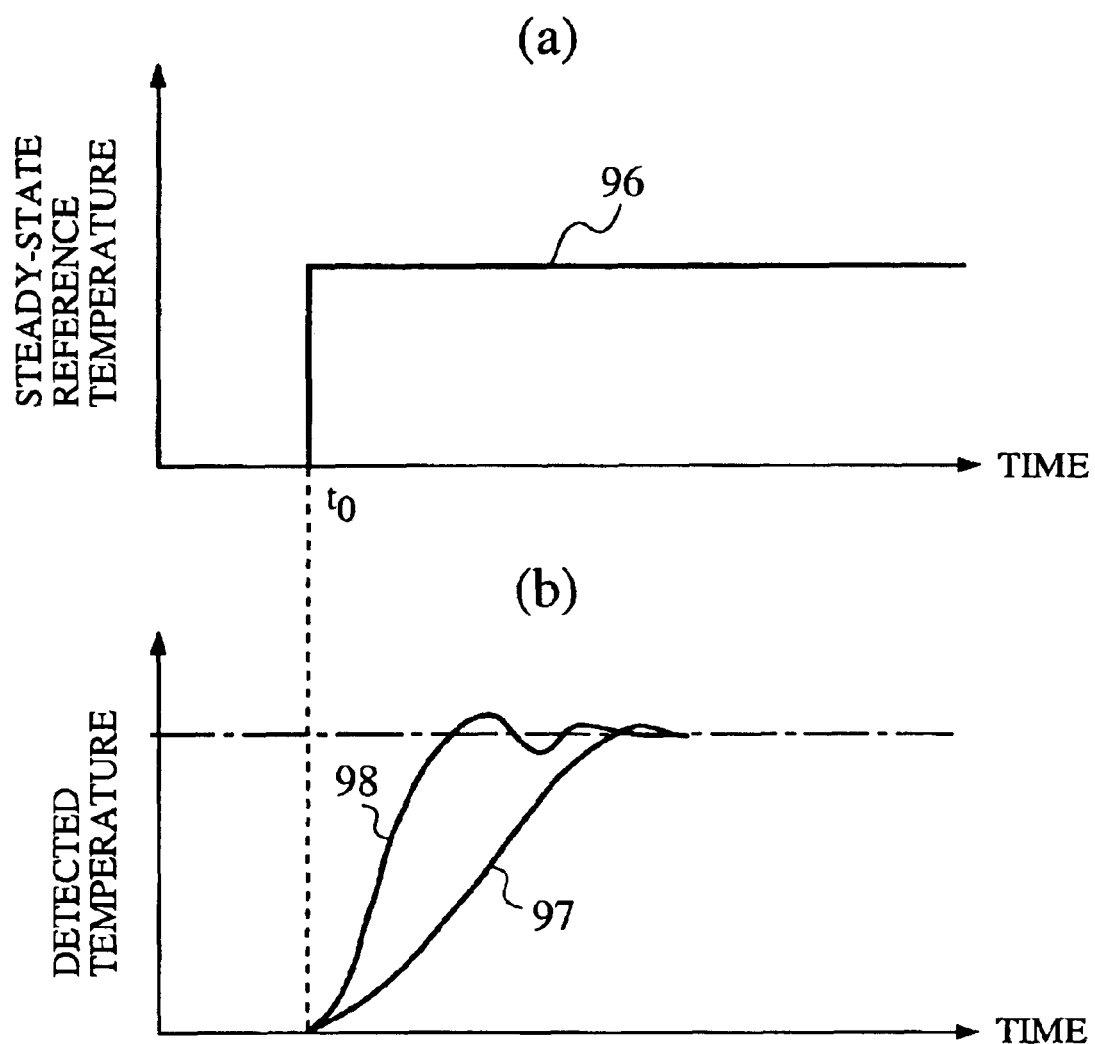
FIG. 20 is a diagram illustrating the temperature characteristics in the case where an addend supplied to a first subtracter and an addend supplied to a second subtracter in the PID control system as shown in FIG. 19 are both equal to the steady-state reference temperature.

Next, a method will be described of making a decision as to whether the steady-state reference temperature is to be supplied to the first control loop or second control loop. FIG. 20 is a diagram illustrating temperature characteristics in the case where the steady-state reference temperature is supplied to both the first subtracter 89 and second subtracter 94 in the PID control system as shown in FIG. 19. In FIG. 20(*a*), the horizontal axis represents time and the vertical axis represents the steady-state reference temperature; and in FIG. 20(*b*), the horizontal axis represents time and the vertical axis represents the detected temperature. In FIG. 20, the reference numeral 96 designates a temperature curve of the steady-state reference temperature, which is set to the first and second control loops in common; 97 designates a temperature curve of the first detected temperature; and 98 designates a temperature curve of the second detected temperature.

Assume that the same steady-state reference temperature is set to both the subtracters 89 and 94 at time t0 as illustrated in FIG. 20(*a*), and that the first detected temperature and second detected temperature vary as illustrated in FIG. 20(*b*). In this case, a decision is made that the steady-state reference temperature is input to the loop whose state variation is the slowest (whose curve has the smallest average inclination), that is, the first control loop (whose time constant is the greatest). This is because by setting thus, the second control loop can follow the temperature variation of the first control loop.

Next, the filtering processing by the filter circuit 92 will be described. The following Eq. 3 and Eq. 4 are equations representing the filtering processing of the filter circuit 92.

In these equations, G(s) is the output of the filter circuit 92, s is the Laplace operator, α is a parameter, D1 is the differential coefficient of the first PID computation circuit 90, and D2 is the differential coefficient of the second PID computation circuit 95. These parameters and the like can be set through an input section not shown.

$$G(s)=1/(1+T\cdot s) \quad \text{Eq. 3}$$

$$T=\alpha(D1+D2)/2 \quad \text{Eq. 4}$$

It is known that the differential coefficient in the PID control approximately agrees with the time constant (time required for the detection value to reach about a 60% level of the preset value) of the temperature curves of FIG. 20 (*b*). The PID control of present embodiment 9 employs the time constants as the differential coefficients.

The value of the foregoing Eq. 3, which is produced by substituting into Eq. 3 the detection value deviation obtained by subtracting the second detected temperature from the first detected temperature, is added to the separate reference value (first detected temperature) of the second control loop. Thus, even if the temperature variation delay of the second detected temperature with respect to the first detected temperature takes place, it can be eliminate by using the margin of the second control loop which is originally controlled on the basis of the time constant D2 (<D1). In particular, since the value of Eq. 3 increases with the increase of the cumulative delay as indicated by Eq. 3, the present embodiment 9 can eliminate the temperature variation delay more positively in the state in which the delay is accumulated.

Furthermore, since the average value of the differential coefficients D1 and D2 in the first and second PID computation circuits 90 and 95 is used as indicated by the foregoing Eq. 4, the present embodiment 9 can not only eliminate the temperature variation delay more effectively than the case where "T=αD1", but also prevent the temperature variation delay from being eliminated excessively as in the case where "T=αD2". As a result, the present embodiment 9 offers an advantage of being able to prevent the temperature variation curve of the second control loop from surpassing the temperature variation curve of the first control loop, and hence to eliminate the temperature variation delay appropriately.

Figure 21:
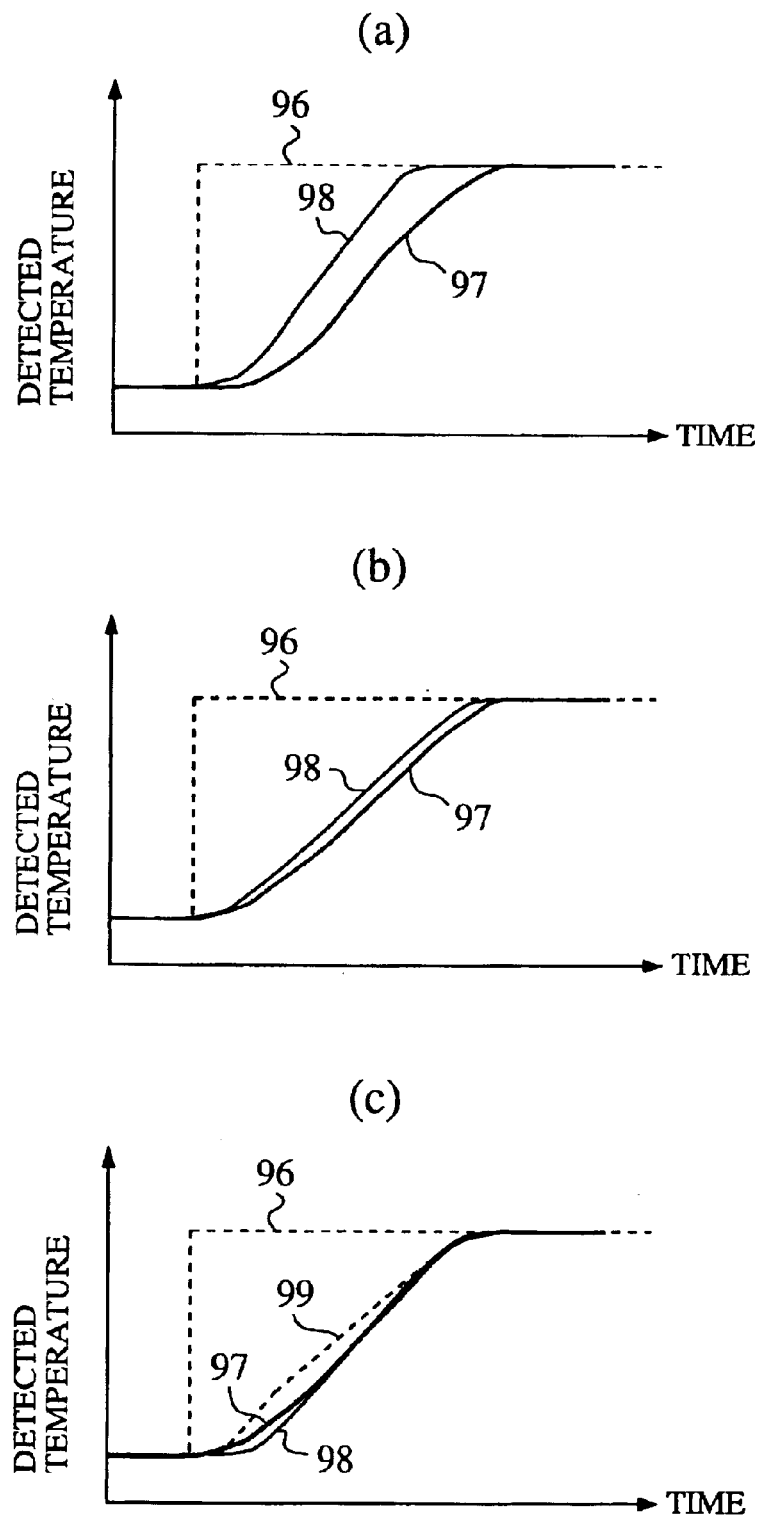
FIG. 21 is a diagram illustrating the temperature control effect of the PID control system of the embodiment 9 in accordance with the present invention.

FIG. 21 is a diagram illustrating the temperature control effect of the PID control system of the embodiment 9 in accordance with the present invention. FIG. 21(*a*) illustrates the temperature curves of the first and second detected temperatures when the steady-state reference temperature is supplied to the second subtracter 94 as the subtrahend; FIG. 21(*b*) illustrates the temperature curves of the first and second detected temperatures when the first detected temperature is supplied to the second subtracter 94 as the subtrahend; and FIG. 21(*c*) illustrates the temperature curves of the first and second detected temperatures when the output of the second reference temperature generating adder 93 is supplied to the second subtracter 94 as the subtrahend as in the present embodiment 9. In FIG. 21, the reference numeral 99 designates a temperature curve of the output of the second reference temperature generating adder 93.

When the first control loop and second control loop receive the steady-state reference temperature as the control reference temperature and operate independently of each other, the difference between the time constants due to the heat efficiency of the heaters and the like appears straightforwardly as the difference in the temperature curve. Accordingly, without any contrivance for equating the time constants by matching the characteristics of the heaters and the like in advance, it is impossible to increase or decrease the temperature with maintaining the uniform temperature. In contrast with this, utilizing the first detected temperature as the control reference temperature of the second control loop makes it possible to increase or decrease the temperature with suppressing the temperature difference between the temperature curves within a temperature difference corresponding to a certain delay time. In particular, as for the control that varies the temperature slowly, the temperature can be increased or decreased, with maintaining the temperature of the controlled system at approximately uniform temperature. Furthermore, the present embodiment 9, which heats a little excessively in response to the temperature difference by using the margin of the second control loop, can increase or decrease the temperature with eliminating the temperature difference corresponding to the certain delay time. Thus, it can increase or decrease the temperature with reducing the temperature difference that actually takes place, and with closely matching the temperatures, even in the control in which the temperature varies suddenly. Thus eliminating the temperature difference during the temperature variations enables the entire controlled system to reach the reference temperature nearly simultaneously. In addition, since no convection occurs due to the temperature gradient between the first heater 82 and second heater 82, the overshoot and undershoot after reaching the reference temperature can be prevented almost completely. As a result, the entire controlled system 81 can be stabilized at the steady-state reference temperature quickly.

As described above, according to the present embodiment 9, there is provided a control system comprising the two manipulating sections, each of which includes the heater 82 and manipulating circuit 86 and varies the temperature of the controlled system 81 independently of each other; the thermocouples 84 for detecting the temperatures of the controlled system 81; and the PID computation circuits 90 and 95 for supplying the two manipulating circuits 86 with the manipulated variables such that the detected temperatures of the controlled system 81 by the thermocouples 84 converge to the steady-state reference temperature, wherein the thermocouples 84 detect the temperatures near the two heaters 82, and the manipulated variable supplied from the PID computation circuit 95 to the manipulating circuit 86 is corrected using the detection value deviation of the second detected temperature with respect to the first detected temperature. Therefore the present embodiment 9 can eliminate the detection value deviation between the first detected temperature and second detected temperature. Accordingly, the two detected temperatures vary to the steady-state reference temperature along nearly the same temperature curves. As a result, in spite of the variations in the temperature characteristics and the like inherent in the differences in the heaters 82 and the zones they operate, all the regions can reach the final steady-state reference value almost simultaneously. In addition, the present embodiment can suppress the overshoot and undershoot after reaching the preset temperature.

Thus, although the present embodiment divides the controlled system into a plurality of zones to be controlled individually, it can match the timings for the zone temperatures to reach the steady-state reference temperature by the basic control without depending on any auxiliary circuit such as a ramp signal generator. In addition, since it can suppress the overshoot and undershoot after reaching the steady-state reference temperature effectively, the present embodiment offers an advantage of being able to control the wafer temperature appropriately in the fabrication process of the semiconductor devices such as CCD sensors.

The present embodiment 9 is configured such that it comprises the steady-state reference temperature memory circuit 88 for storing the steady-state reference temperature, and the two PID computation circuits 90 and 95 equipped for the individual manipulating circuits 86, respectively, for calculating and outputting the manipulated variables for the individual manipulating circuits 86 by using the control deviations of the detected temperatures with respect to the separate reference temperatures, and that the first PID computation circuit 90 is supplied with the steady-state reference temperature as the separate reference value, and the second PID computation circuit 95 is supplied with the detection value of the reference as the separate reference value. As a result, the present embodiment can further suppress the detection value error than when the steady-state reference values are separately set to the individual PID computation circuits 90 and 95, and hence can reduce the absolute value of the detection value deviation by that amount, thereby being able to uniform the detection values.

According to the present embodiment 9, the PID computation circuit 90, which has the slowest state variation when the same separate reference value is supplied to all the PID computation circuits 90 and 95, is selected as the first PID computation circuit 90 corresponding to the reference detection value; and the other PID computation circuit 95 is supplied with the value to which is added the value obtained by filtering the detection value deviation using the average value of the differential control coefficient D2 in the other PID computation circuit 95 and the differential control coefficient D1 in the selected PID computation circuit. Accordingly, the control of all the PID computation circuits 90 and 95 is carried out in response to the control characteristics of the PID computation circuit 90 whose state variation is the slowest. In addition, it is possible for the other PID computation circuit 95 with the better control characteristics than the slowest PID computation circuit 90 to be controlled such that the detection value deviation is eliminated. As a result, the present embodiment can suppress the variations in the detection value effectively.

Embodiment 10

Figure 22:
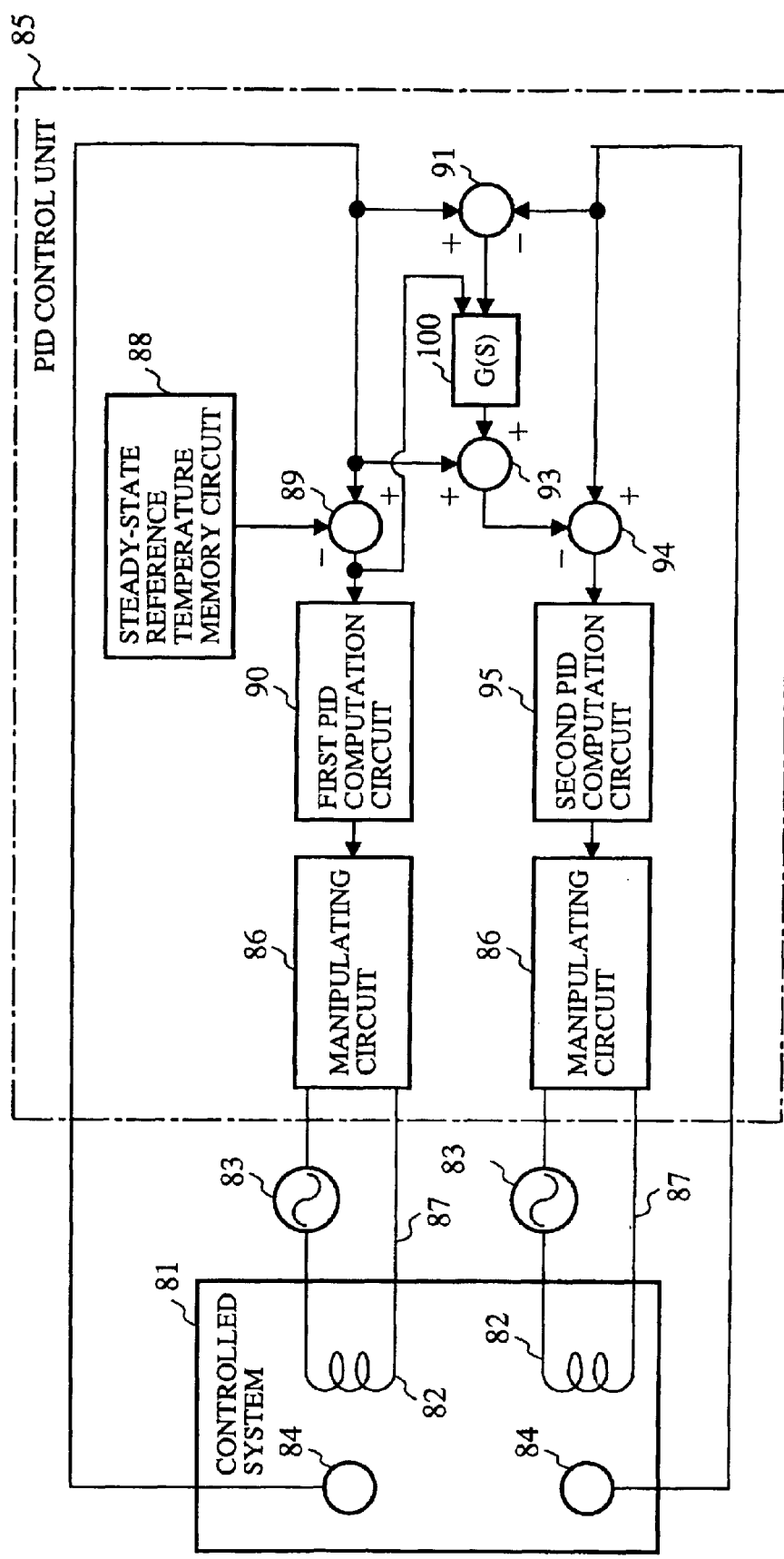
FIG. 22 is a block diagram showing a configuration of a PID control system of an embodiment 10 in accordance with the present invention.

FIG. 22 is a block diagram showing a configuration of a PID control system of an embodiment 10 in accordance with the present invention. In FIG. 22, the reference numeral 100 designates a filter circuit (control section) for receiving the detected temperature deviation along with the first control deviation, and for outputting a filtered detected temperature deviation by carrying out the filtering processing in accordance with the following Eq. 5.

$$
\begin{aligned}
&\text{offset} = 0 \text{ (when "SP1 - PV1" is within 0.5\% fs and}\\
&\quad\text{"PV1" is stable)}\\
&\text{offset} = \text{filter}((\text{PV1} - \text{PV2})(\text{SP1} - \text{PV1}))\\
&\quad\text{(when "SP1 - PV1" is greater than 0.5\% fs, or}\\
&\quad\text{"PV1" is unsettled)}
\end{aligned}
\quad\text{Eq. 5}
$$

where the offset is the filtered detected temperature deviation, SP1 is the steady-state reference temperature, PV1 is the first detected temperature, PV2 is the second detected temperature, fs is the input sampling frequency of the filter circuit, and filter( ) is a first-order filter function.

Since the remaining configuration is the same as that of the foregoing embodiment 9, the description thereof is omitted here.

Next, the operation will be described.

When the controlled system 81 is stable at a particular temperature such as a room temperature, "SP1-PV1" is within 0.5% fs and "PV1" becomes stable. Thus, the output of the filter circuit 100 is zero in accordance with the foregoing Eq. 5, and hence the second reference temperature generating adder 93 outputs the first detected temperature itself. Accordingly, the second control loop carries out the temperature control such that the second detected temperature becomes equal to the first detected temperature.

When a new steady-state reference temperature is stored in the steady-state reference temperature memory circuit 88 in such a condition, the first subtracter 89 subtracts the steady-state reference temperature from the first detected temperature. Therefore the first control loop carries out its control until the difference between the first detected temperature and steady-state reference temperature becomes zero, that is, until the first detected temperature becomes equal to the steady-state reference temperature.

The second reference temperature generating adder 93 outputs the modified first detected temperature, so that the second control loop starts the control in such a manner that the second detected temperature becomes equal to the first detected temperature. On the other hand, when "SP1-PV1" is greater than 0.5% fs, or the "PV1" is unsettled, the filter circuit 100 outputs the filtered detected temperature deviation based on the foregoing Eq. 5 using the temperature difference of the second detected temperature with respect to the first detected temperature. The filtered detected temperature deviation increases with an increase in "PV1-PV2" and with an increase in "SP1-PV1", and hence has the property of increasing with the temperature difference of the preset steady-state reference temperature with respect to the current temperature. Consequently, comparing with the foregoing embodiment 9 that uses only "PV1-PV2" as a variable, the present embodiment 10 offers an advantage of being able to carry out the optimum correction in a wider temperature gradient range. In addition, since it uses a first-order filter, the offset value varies continuously even at the switching between the control based on "offset=0" and the control based on "offset=filter((PV1-PV2)(SP1-PV1))".

Furthermore, when the first detected temperature and second detected temperature approach the steady-state reference temperature so that "SP1-PV1" enters within 0.5% fs and "PV1" becomes stable, the second reference temperature generating adder 93 outputs the first detected temperature itself. Since the remaining configuration is the same as that of the foregoing embodiment 9, the description thereof is omitted here.

Although the foregoing embodiments are described by way of example using the PID computation circuits 90 and 95 as the control unit, similar advantages are gained using an IMC computation circuit. In addition, although the detection value deviation between the first detected temperature and second detected temperature is filtered, and the filtered output is added to the first detected temperature used as the reference in the present invention, this is not essential. For example, nearly the same advantages are obtained by adding the difference between the first detected temperature and second detected temperature directly to the first detected temperature.

Embodiment 11

Figure 23:
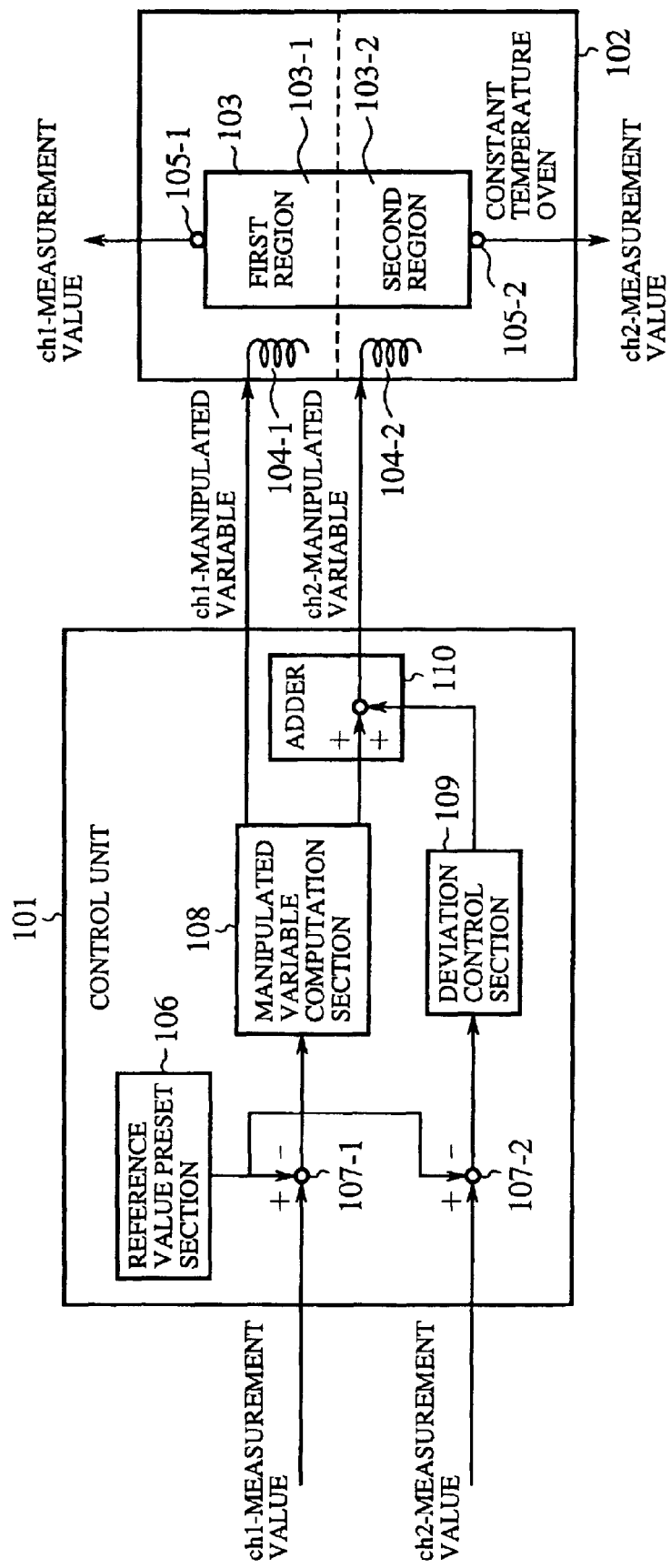
FIG. 23 is a block diagram showing a configuration of a control system using a control unit of an embodiment 11 in accordance with the present invention.

FIG. 23 is a block diagram showing a configuration of a control system using the control unit in accordance with the present invention for carrying out uniform temperature control of a wafer, that is, a controlled system, in its entirety. In FIG. 23, the reference numeral 101 designates a control unit having a PID control function, 102 designates a constant temperature oven, and 103 designates a wafer placed in the constant temperature oven 102. Reference numerals 104-1 and 104-2 designate heaters for controlling the internal temperature of the constant temperature oven 102 in response to manipulated variables fed from the control unit 1; and 105-1 and 105-2 designate temperature sensors for detecting temperatures near first and second regions 103-1 and 103-2 of the wafer 103. The reference numeral 106 designates a reference value preset section for presetting a reference temperature of the wafer 103. Reference numerals 107-1 and 107-2 each designate an adder. The reference numeral 108 designates a manipulated variable computation section, 109 designates a deviation control section, and 110 designates an adder.

Next, the operation will be described.

The control unit 101 carries out the following calculations. The first adder 107-1 calculates a deviation between a ch1-measurement value and a preset value fed from the reference value preset section 106, where the ch1-measurement value is a temperature measurement value detected by the temperature sensor 105-1 in the first region 103-1 of the wafer 103, that is, the controlled system. The second adder 107-2 calculates a deviation between a ch2-measurement value and a preset value fed from the reference value preset section 106, where the ch2-measurement value is a temperature measurement value detected by the temperature sensor 105-2 in the second region 103-2 of the wafer 103. According to the deviation output from the first adder 107-1, the manipulated variable computation section 108 performs PID control, for example, and computes a manipulated variable. Here, the control unit 101 supplies the heater 104-1 disposed in the first region 103-1 with the computed manipulated variable as the ch1-manipulated variable (first region manipulated variable). On the other hand, according to the deviation output from the second adder 107-2, the deviation control section 109 performs PID control, for example, and computes a manipulated variable. The adder 110 adds the manipulated variables computed by the manipulated variable computation section 108 and deviation control section 109, and supplies the sum to the heater, 104-2 disposed in the second region 103-2 as the ch2-manipulated variable (second region manipulated variable).

According to the embodiment 11, the control of the first region 103-1 is carried out appropriately for changes in the type or environment of the wafer 103 which is the controlled system. This is because the ch1-manipulated variable supplied to the first region 103-1 is a value calculated by the PID control or the like from the deviation between the reference preset temperature and the ch1-measurement value, the temperature measurement value in the first region 103-1. In contrast, if the ch2-manipulated variable supplied to the second region 103-2 is a manipulated variable calculated by the manipulated variable computation section 108, the temperature measurement value of the second region 103-2 has a certain deviation as mentioned above.

To eliminate the deviation, the deviation control section 109 is provided. More specifically, the deviation control section 109 calculates and produces the manipulated variable from the deviation between the reference temperature preset value and the ch2-measurement value, the temperature measurement value in the second region 103-2, by means of the PID control or the like. Then, the adder 110 adds the manipulated variables computed by the manipulated variable computation section 108 and deviation control section 109, and outputs the ch2-manipulated variable. Thus, the deviation control section 109 eliminates the certain deviation of the temperature measurement value taking place in the second region 103-2 by the computed manipulated variable.

In this way, as for the certain deviation of the temperature measurement value, which occurs conventionally in the second region when the type of the wafer 103 or the environment of the controlled system is changed, the embodiment 11 can eliminate it by installing the deviation control section 109 and adder 110.

Embodiment 12

Next, the embodiment 12 will be described.

Figure 24:
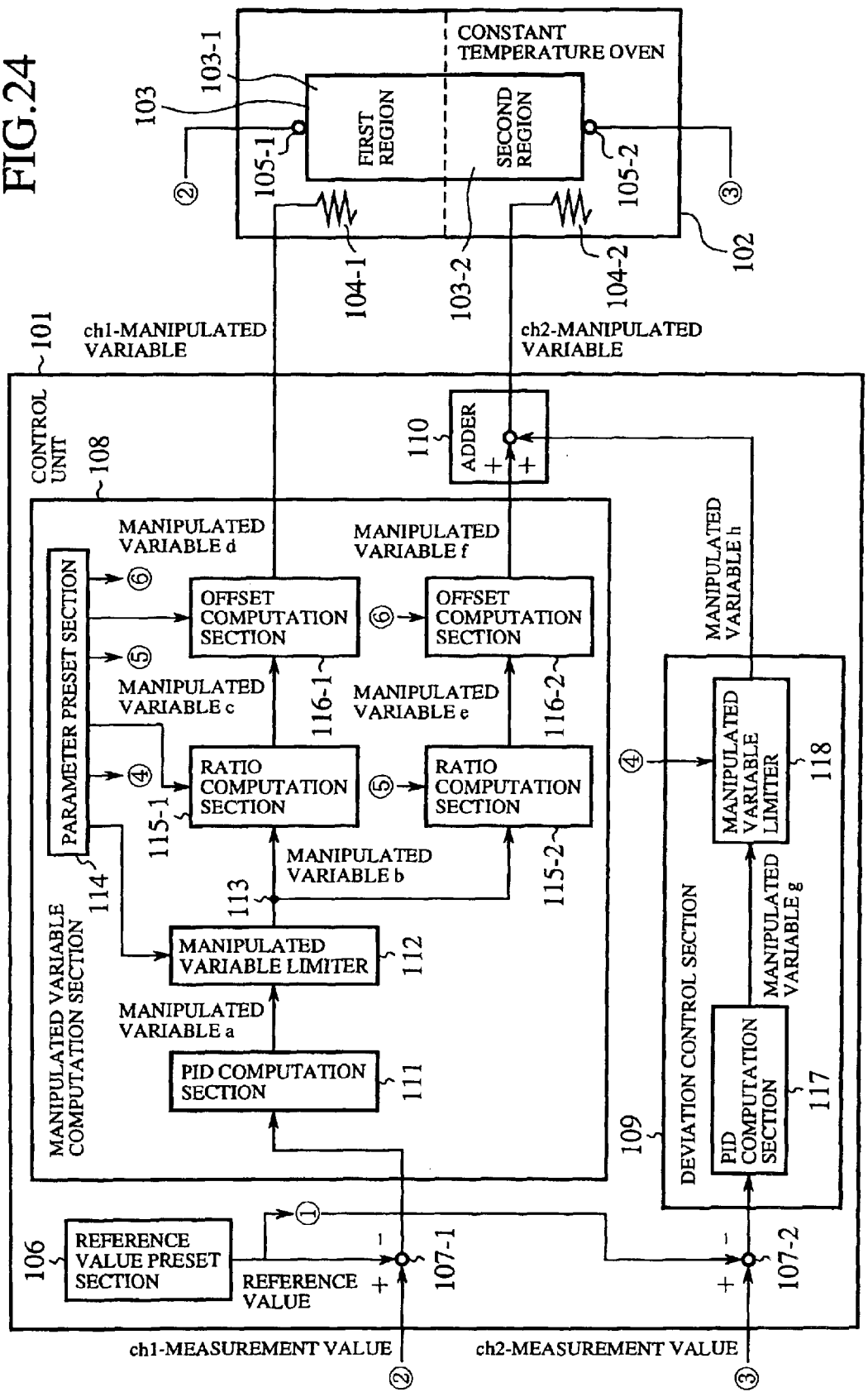
FIG. 24 is a block diagram showing a configuration of a control system using a control unit of an embodiment 12 in accordance with the present invention.

FIG. 24 is a block diagram showing a configuration of a control system using the control unit in accordance with the present invention. In FIG. 24, the reference numeral 101 designates a control unit having a PID control function, 102 designates a constant temperature oven, and 103 designates a wafer placed in the constant temperature oven. The reference numeral 104-1 designates a heater for controlling an upper part temperature (corresponding to a first region 103-1) inside the constant temperature oven 102 in accordance with the ch1-manipulated variable; and 104-2 designates a heater for controlling a lower part temperature (corresponding to a second region 103-2) inside the constant temperature oven 102 in accordance with the ch2-manipulated variable. The reference numeral 105-1 designates a temperature sensor disposed near the wafer 103, for detecting the upper part temperature in the constant temperature oven 102; and 105-2 designates a temperature sensor disposed near the wafer 103, for detecting the lower part temperature in the constant temperature oven 102.

The reference numeral 106 designates a reference value preset section for presetting the reference temperature of the wafer 103; and 107-1 designates a first adder for calculating a deviation between the ch1-measurement value of the temperature detected by the temperature sensor 105-1 and the preset value fed from the reference value preset section 106. The reference numeral 111 designates a PID computation section (first PID computation section) for outputting a manipulated variable by performing the PID computation on the deviation the adder 107-1 calculates; and 112 designates a manipulated variable limiter (first manipulated variable limiter) for imposing an upper limit and lower limit on the manipulated variable. Reference numerals 115-1 and 115-2 designate a first ratio computation section and second ratio computation section for performing a ratio computation on a manipulated variable b; and 116-1 and 116-2 designate a first offset computation section and second offset computation section for performing an offset computation on manipulated variables c and e, respectively. The reference numeral 113 designates a branch point for branching the manipulated variable b from the manipulated variable limiter 112; 114 designates a parameter preset section such as a keyboard for manually setting parameters of the manipulated variable limiter 112; and 110 designates an adder for calculating a ch2-manipulated variable from a manipulated variable f computed by the offset computation section 116-2 and a manipulated variable h limited by a manipulated variable limiter 118 which will be described below.

The reference numeral 107-2 designates a second adder for calculating a deviation from the ch2-measurement value of the temperature detected by the temperature sensor 105-2 and the preset value set by the reference value preset section 106; 117 designates a PID computation section (second PID computation section) for performing a PID computation on the deviation the second adder 107-2 calculates, and for outputting a manipulated variable g; and 118 designates a manipulated variable limiter (second manipulated variable limiter) for imposing an upper limit or lower limit on the manipulated variable g.

Next, the operation will be described.

The control unit 101 receives the ch1-measurement value corresponding to the temperature the temperature sensor 105-1 disposed in the first region 103-1 detects, and the ch2-measurement value corresponding to the temperature the temperature sensor 105-2 disposed in the second region 103-2 detects. Then, it generates the ch1-manipulated variable and ch2-manipulated variable, and supplies the ch1-manipulated variable signal to the heater 104-1 disposed in the first region 103-1, and the ch2-manipulated variable signal to the heater 104-2 disposed in the second region 103-2.

Varying the energized duration in response to the ch1-manipulated variable signal, for example, the heater 104-1 controls the temperature at the first region 103-1 in the constant temperature oven 102. Likewise, the heater 104-2 controls the temperature at the second region 103-2 in the constant temperature oven 102 in response to the ch2-manipulated variable signal.

Next, the internal processing of the control unit 101 will be described.

The reference value preset section 106 sets the preset value of a desired reference temperature of the wafer 103 in response to the input operation via a keyboard not shown. The reference temperature preset value is supplied to the first adder 107-1 and second adder 107-2. The parameter preset section 114 sets the parameters of the manipulated variable limiter 112, first ratio computation section 115-1, first offset computation section 116-1, second ratio computation section 115-2, second offset computation section 116-2 and manipulated variable limiter 118 in response to the key operation of the keyboard not shown.

The parameters of the manipulated variable limiter 112 and manipulated variable limiter 118 are their upper limit values and lower limit values. The parameters of the first ratio computation section 115-1 and second ratio computation section 115-2 are their ratio values. The parameters of the first offset computation section 116-1 and second offset computation section 116-2 are their offset values. The meaning of the parameters will be described in connection with the individual sections.

The first adder 107-1 calculates the deviation between the preset value of the reference temperature set by the reference value preset section 106 and the ch1-measurement value, and supplies it to the PID computation section 111. For example, when the preset value is 100° C., and the ch1-measurement value is 90° C., the deviation equals 90−100=−10° C. Thus, the first adder 107-1 outputs the value.

The PID computation section 111 has a PID value preset by the key operation of the PID value preset section not shown. The PID computation section 111, receiving the deviation calculated by the first adder 107-1, calculates the manipulated variable a by the computation of the PID control, and supplies the manipulated variable a to the manipulated variable limiter 112. The manipulated variable a usually takes a value ranging from 0% to 100%.

The manipulated variable limiter 112 puts the upper limit value and lower limit value, which are set by the parameter preset section 114, on the manipulated variable a calculated by the PID computation section 111, and supplies the manipulated variable b to the branch point 113. For example, when the upper limit value of 80% and lower limit value of 20% are preset, the manipulated variable a of 90% is restricted to the upper limit value of 80%, and the manipulated variable a of 10% is restricted to the lower limit value of 20%. The manipulated variable limiter 112 outputs the manipulated variable b=80% in the former case, and the manipulated variable b=20% in the latter case. As for the manipulated variable a of 50%, since it is not restricted to either the upper limit value or lower limit value, the manipulated variable b=50% is output without change.

The branch point 113 splits the manipulated variable b passing through the limit by the manipulated variable limiter 112 into a path for directly generating the ch1-manipulated variable and a path for generating the ch2-manipulated variable. The first ratio computation section 115-1 multiplies the manipulated variable b branched by the branch point 113 by the ratio value preset by the parameter preset section 114, and supplies the resultant manipulated variable c to the first offset computation section 116-1. For example, when the ratio value of 0.8 is preset and the manipulated variable b is 50%, the first ratio computation section 115-1 calculates 50×0.8=40%, and outputs the manipulated variable c=40%.

The first offset computation section 116-1 adds the offset value preset by the parameter preset section 114 to the manipulated variable c output from the first ratio computation section 115-1, and supplies the heater 104-1 with the resultant manipulated variable d as the ch1-manipulated variable. For example, when the preset offset value is 10 and the manipulated variable c is 50%, the first offset computation section 116-1 calculates 50+10=60%, and outputs the manipulated variable d=60%.

The second ratio computation section 115-2 multiplies the manipulated variable b branched by the branch point 113 by the ratio value preset by the parameter preset section 114, and supplies the resultant manipulated variable e to the offset computation section 116-2. The second offset computation section 116-2 adds the offset value preset by the parameter preset section 114 to the manipulated variable e output from the second ratio computation section 115-2, and supplies the resultant manipulated variable f to the adder 110.

On the other hand, the second adder 107-2 calculates the deviation between the preset value of the reference temperature set by the reference value preset section 106 and the ch2-measurement value, and supplies it to the PID computation section 117. The PID computation section 117 has a PID value preset by the key operation of the PID value preset section not shown. The PID computation section 117, receiving the deviation calculated by the second adder 107-2, calculates the manipulated variable g by the computation of the PID control, and supplies it to the manipulated variable limiter 118. The manipulated variable g usually takes a value ranging from 0% to 100%.

The manipulated variable limiter 118 puts the upper limit value and lower limit value, which are set by the parameter preset section 114, on the manipulated variable g calculated by the PID computation section 117, and supplies the manipulated variable h to the adder 110.

The adder 110 adds the manipulated variable f calculated by the second offset computation section 116-2 to the manipulated variable h restricted by the manipulated variable limiter 118, and supplies the resultant ch2-manipulated variable to the heater 104-2. For example, when the manipulated variable f is 50% and the manipulated variable h is 5%, the adder 110 calculates 50+5=55%, and outputs the ch2-manipulated variable of 55%.

Figure 25:
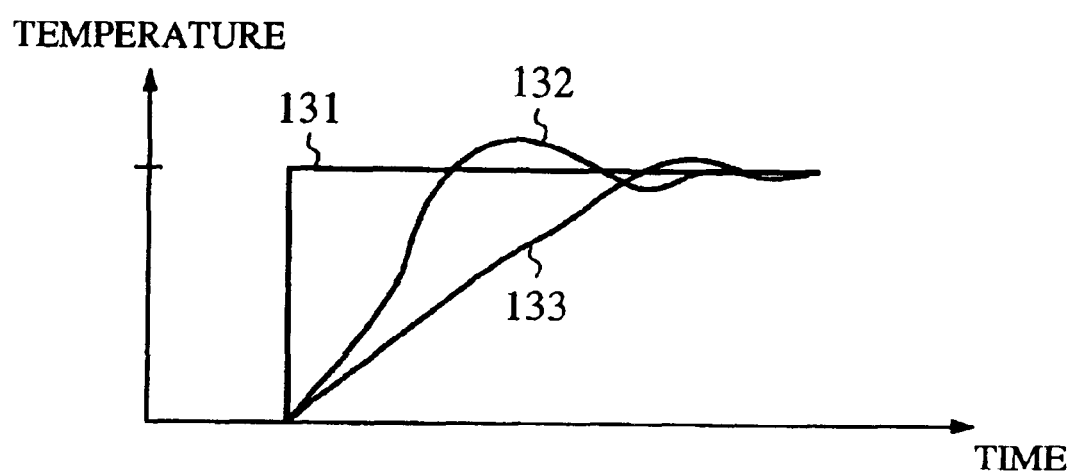
FIG. 25 is a characteristic diagram illustrating the temperature of the control system using the control unit of the embodiment 12 in accordance with the present invention.

Next, referring to FIG. 25, the temperature characteristic diagram of the control system, which employs the control unit of the embodiment 12 as shown in FIG. 24, will be described. FIG. 25 is a diagram illustrating the temperature characteristics after replacing the wafer of the controlled system by another type of wafer. In FIG. 25, the reference numeral 131 designates a reference temperature preset value set by the reference value preset section 106; 132 designates a temperature-measurement value the temperature sensor 105-1 in the first region 103-1 detects; and 133 designates a temperature measurement value the temperature sensor 105-2 in the second region 103-2 detects.

In the temperature control of the wafer before replacing it by another type of wafer, the parameters of the following sections are preset in the preadjustment process so that the temperature measurement values 132 and 133 agree with the reference preset temperature: the manipulated variable limiter 112, manipulated variable limiter 118, first ratio computation section 115-1, second ratio computation section 115-2, first offset computation section 116-1, and second offset computation section 116-2. Accordingly, as illustrated in the temperature characteristic diagram of FIG. 5(1), the temperature measurement values 132 and 133 agree with the reference preset temperature, which means that the appropriate control is achieved. After replacing the wafer, the temperature measurement values 132 and 133 agree with the reference preset temperature as illustrated in FIG. 25, which means that the appropriate control is achieved.

According to the embodiment 12, the control of the first region 103-1 is carried out appropriately for changes in the type or environment of the wafer 103 which is the controlled system. This is because the ch1-manipulated variable supplied to the first region 103-1 is a value calculated by the PID control or the like from the deviation between the reference preset temperature and the ch1-measurement value, the temperature measurement value in the first region 103-1.

In contrast, if the ch2-manipulated variable supplied to the second region 103-2 is a manipulated variable f calculated from the ch1-measurement value by the manipulated variable computation section 111 and the like, the temperature measurement value of the second region 103-2 has a certain deviation as mentioned above.

To eliminate the deviation, the second adder 107-2, PID computation section 117, manipulated variable limiter 118 and the adder 110 are provided. More specifically, the deviation control section 109 including the PID computation section 117 and second adder 107-2 produces the manipulated variable h by performing the PID control on the deviation the second adder 107-2 calculates from the reference temperature preset value and the ch2-measurement value which is the temperature measurement value in the second region 103-2.

Then, the adder 110 calculates the ch2-manipulated variable by adding the manipulated variable f computed from the ch1-measurement value to the manipulated variable h computed from the ch2-measurement value, and supplies it to the heater 104-2. Thus, the manipulated variable h calculated from the ch2-measurement value can eliminate the certain deviation of the temperature measurement value taking place in the second region 103-2.

In this way, as for the certain deviation of the temperature measurement value, which occurs conventionally in the second region 103-2 when the type of the wafer or the environment of the controlled system is changed, the embodiment 12 can eliminate it by installing the second adder 107-2, PID computation section 117, manipulated variable limiter 118, and the adder 110.

Although the embodiment 12 carries out the uniform temperature control over the entire wafer 103 by supplying the preset value set by the reference value preset section 106 to the second adder 107-2, this is not essential. For example, instead of the preset value, the ch1-measurement value can be supplied to the second adder 107-2. The configuration, which supplies the ch1-measurement value to the second adder 107-2, can cause the temperature characteristic of the second region 103-2 of the wafer 3 to follow the temperature characteristic of the first region 103-1. Thus, the configuration is effective to increase or decrease the wafer temperature at a fixed gradient.

Although the foregoing embodiments are described by way of example of using the PID control, they are applicable to IMC (Internal Model control) control and the like.

INDUSTRIAL APPLICABILITY

As described above, the control system and control unit in accordance with the present invention are suitable for controlling the temperature of a wafer uniformly in its entirety by using a plurality of heaters in the semiconductor process and the like.

What is claimed is:

1. A control system for carrying out control such that a detection value as to a condition of a controlled system converges to a steady-state reference value, said control system comprising:

a main computation section for carrying out control of said controlled system by receiving the steady-state reference value and the detection value, and by generating a manipulated variable that varies such that the detection value converges to the steady-state reference value;

a main detecting section for supplying said main computation section with the detection value;

a sub-computation section for carrying out control of said controlled system by receiving the detection value of said main detecting section and another detection value, and by generating a manipulated variable that varies such that the another detection value converges to the detection value input to said main computation section; and a sub-detecting section for supplying said sub-computation section with the another detection value.

2. The control system according to claim 1, further comprising a first selector for receiving the steady-state reference value and the detection value of said main detecting section, and for selecting and supplying one of them to said sub-computation section.

3. The control system according to claim 1, wherein said sub-computation section adds a specified offset value to the input steady-state reference value or to the input detection value fed from said main detecting section, and controls said controlled system in response to the resultant sum.

4. The control system according to claim 1, further comprising a steady-state reference value memory for storing the steady-state reference value and for supplying it to said main computation section and sub-computation section.

5. The control system according to claim 1, further comprising:

steady-state reference value memories for outputting steady-state reference values, a number of said steady-state reference value memories being equal to a total number of said main computation section and said sub-computation section; and a second selector for switching input sources to said main computation section or to said sub-computation sections among said steady-state reference value memories.

6. A control system for carrying out control such that a detection value as to a condition of a controlled system converges to a steady-state reference value, said control system comprising:

a computation section for receiving the steady-state reference value and the detection value, and for outputting a first manipulated variable that varies such that the detection value converges to the steady-state reference value;

a plurality of multiplication sections for receiving the first manipulated variable, and for outputting second manipulated variables by multiplying the first manipulated variable by preset ratio coefficients; and a ratio coefficient preset section for calculating ratio coefficients for said multiplication sections individually, and for setting the ratio coefficients to said multiplication sections, said ratio coefficients being calculated from the detection values of regions of the controlled system installed in correspondence to said plurality of multiplication sections, to reduce errors of the detection values of the regions of said controlled system with respect to the steady-state reference value, wherein said control system carries out control of said controlled system in response to the second manipulated variables.

7. A control system for carrying out control such that a detection value as to a condition of a controlled system converges to a steady-state reference value, said control system comprising:

N computation sections for receiving the steady-state reference value and the detection value, and for outputting a first manipulated variable that varies such that the detection value converges to the steady-state reference value, where N is an integer greater than one;

N multiplication sections for receiving the first manipulated variable, and for outputting second manipulated variables by multiplying the first manipulated variable by preset ratio coefficients; and a first selector for switching input sources to said multiplication sections among said N computation sections, wherein said control system carries out control of said controlled system in response to the second manipulated variables.

8. A control system for carrying out control such that a detection value as to a condition of a controlled system converges to a steady-state reference value, said control system comprising:

a computation section for receiving the steady-state reference value and the detection value, and for outputting a first manipulated variable that varies such that the detection value converges to the steady-state reference value;

a plurality of multiplication sections for receiving the first manipulated variable, and for out putting second manipulated variables by multiplying the first manipulated variable by preset ratio coefficients; and a second selector for receiving a first manipulated variable and a second manipulated variable, and for selecting and outputting one of them, wherein said control system controls the controlled system in response to the output of said second selector.

9. A control system comprising:

a plurality of manipulating sections for varying a state of a controlled system independently of each other;

a detecting section for detecting states of the controlled system; and a control section for supplying said plurality of manipulating sections with manipulated variables such that detection values as to the states of the controlled system by said detecting section converge to a steady-state reference value, wherein said detecting section detects the states in neighborhoods of all of said manipulating sections; and the manipulated variables said control section supplies to said manipulating sections are corrected using detection value deviations of the detection values near the manipulating sections with reference to a particular one of the detection values.

10. The control system according to claim 9, wherein said control unit comprises:

a steady-state reference value memory circuit for storing a steady-state reference value; and computation circuits installed in a one-to-one correspondence to said manipulating sections, for calculating and outputting the manipulated variables for the manipulating sections by using control deviations of the detection values with respect to separate reference values, wherein one of said computation circuits, which corresponds to the manipulating section associated with the reference detection value, is supplied with the steady-state reference value as a separate reference value, and a remaining computation circuit is supplied with the reference detection value as the separate reference value.

11. A control unit that calculates manipulated variables such that measurement values, which represent states of a controlled system consisting of a plurality of regions, agree with a preset value, and that carries out control by supplying the regions with the manipulated variables, respectively, said control unit comprising:

a manipulated variable computation section for calculating a first manipulated variable and a second manipulated variable in accordance with the measurement value of a first region of said controlled system and the preset value, and for supplying the first manipulated variable to the first region as a first region manipulated variable;

a deviation control section for calculating a third manipulated variable from the measurement value of a remaining region of said controlled system and one of the preset value and the measurement value of the first region; and an adder for computing a manipulated variable from the second manipulated variable calculated by said manipulated variable computation section and the third manipulated variable calculated by said deviation control section, and for supplying the computed manipulated variable to the remaining region as a remaining region manipulated variable.

* * * * *